United States Patent
Park et al.

(10) Patent No.: US 8,483,723 B2
(45) Date of Patent: Jul. 9, 2013

(54) METHOD OF LOCATION UPDATE IN A WIRELESS COMMUNICATION SYSTEM

(75) Inventors: Gi Won Park, Anyang-si (KR); Tae Gon Kong, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/139,916

(22) PCT Filed: Dec. 15, 2009

(86) PCT No.: PCT/KR2009/007504
§ 371 (c)(1),
(2), (4) Date: Sep. 2, 2011

(87) PCT Pub. No.: WO2010/071345
PCT Pub. Date: Jun. 24, 2010

(65) Prior Publication Data
US 2011/0312338 A1 Dec. 22, 2011

Related U.S. Application Data

(60) Provisional application No. 61/122,412, filed on Dec. 15, 2008, provisional application No. 61/141,670, filed on Dec. 31, 2008, provisional application No. 61/162,331, filed on Mar. 22, 2009.

(30) Foreign Application Priority Data

| Mar. 17, 2009 | (KR) | 10-2009-0022495 |
| May 27, 2009 | (KR) | 10-2009-0046483 |
| Nov. 9, 2009 | (KR) | 10-2009-0107578 |

(51) Int. Cl.
*H04Q 7/20* (2006.01)

(52) U.S. Cl.
USPC .......... 455/456.6; 455/456.1; 455/456.5; 455/458

(58) Field of Classification Search
USPC .......... 455/456.6, 456.1, 456.5, 458
See application file for complete search history.

(56) References Cited

U.S. PATENT DOCUMENTS

| 7,092,722 B1 | 8/2006 | Oh et al. |
| 7,991,409 B2 | 8/2011 | Qi et al. |

(Continued)

FOREIGN PATENT DOCUMENTS

| JP | 9-205677 A | 8/1997 |
| KR | 10-2005-0050798 A | 6/2005 |

(Continued)

OTHER PUBLICATIONS

Park et al., "Idle Mode Operation for Supporting FemtoCells," IEEE C802.16m-08/1433, Oct. 31, 2008, 13 pages.

(Continued)

*Primary Examiner* — Danh Le
(74) *Attorney, Agent, or Firm* — Birch, Stewart, Kolasch & Birch, LLP

(57) ABSTRACT

A location update method in a wireless communication system is disclosed. The method for performing a location update in a mobile station (MS) of the wireless communication system including a femtocell includes receiving a deregistration command (DREG-CMD) message that includes not only a paging group identifier (ID) of a first femtocell base station (BS) in which the MS stays but also a paging group ID of a macro BS including the first femtocell BS, initiating a location update delay timer while the MS moves from the first femtocell area to a second femtocell area having a paging group ID different from that of the first femtocell, and performing location update according to an operation of the location update delay timer.

10 Claims, 18 Drawing Sheets

U.S. PATENT DOCUMENTS

| | | | |
|---|---|---|---|
| 2006/0025134 A1 | 2/2006 | Cho et al. | |
| 2007/0105600 A1* | 5/2007 | Mohanty et al. | 455/574 |
| 2007/0218926 A1* | 9/2007 | Zhuang et al. | 455/466 |
| 2008/0102789 A1 | 5/2008 | Sung | |
| 2008/0259912 A1* | 10/2008 | Wang et al. | 370/356 |
| 2008/0304434 A1* | 12/2008 | Giaretta et al. | 370/313 |
| 2009/0176513 A1* | 7/2009 | Bosch et al. | 455/458 |

FOREIGN PATENT DOCUMENTS

| | | |
|---|---|---|
| KR | 10-2005-0089697 A | 9/2005 |
| KR | 10-2007-0036756 A | 4/2007 |
| KR | 10-0778339 B1 | 11/2007 |
| KR | 10-2008-0011513 A | 2/2008 |
| KR | 10-2008-0038797 A | 5/2008 |
| KR | 10-2008-0044599 A | 5/2008 |

OTHER PUBLICATIONS

Zheng et al., "Paging in Femto," IEEE 802.16 Presentation Submission Template (Rev. 9), IEEE C802.16m-08/1266, Oct. 31, 2008, 7 pages.

* cited by examiner (a)

(b)

(a)

T : Location Update Timer
P : Location Update Delay Timer (b)

(a)

T : Location Update Timer
P : Location Update Delay Timer (b)

(a)

(b)

(c)

(d)

METHOD OF LOCATION UPDATE IN A WIRELESS COMMUNICATION SYSTEM

CROSS REFERENCE TO RELATED APPLICATIONS

This application is the National Phase of PCT/KR2009/007504 filed on Dec. 15, 2009, which claims priority under 35 U.S.C. 119(e) to U.S. Provisional Application No. 61/122,412 filed on Dec. 15, 2008, U.S. Provisional Application No. 61/141,670 filed on Dec. 31, 2008, and U.S. Provisional Application No. 61/162,331 filed on Mar. 22, 2009 and under 35 U.S.C. 119(a) to Patent Application No. 10-2009-0022495 filed in the Republic of Korea on Mar. 17, 2009, Patent Application No. 10-2009-0046483 filed in the Republic of Korea on May 27, 2009, and Patent Application No. 10-2009-0107578 filed in the Republic of Korea on Nov. 9, 2009, all of which are hereby expressly incorporated by reference into the present application.

TECHNICAL FIELD

The present invention relates to a wireless communication system, and more particularly to a location update method for use in a wireless communication system including a femto-cell.

BACKGROUND ART

A brief description will be given below of an idle mode of a mobile station and a paging group in relation to exemplary embodiments of the present invention.

A broadband wireless access system supports an idle mode to minimize power consumption of a mobile station. Generally, the idle mode is intended to serve as a mechanism to allow an MS to become periodically available for downlink broadcast traffic messaging without requiring the MS to register to any particular base station as the MS moves in a radio link environment populated by multiple base stations.

During the idle mode, the MS need not be handed off while moving between base stations contained in the same paging zone. Therefore, the MS need not transmit uplink information for the handoff procedure, resulting in a reduction in power consumption.

If the MS has not received traffic from a base station for a predetermined time, it may transition to the idle mode to save power. In the idle mode, the mobile station receives a broadcast message (e.g. a paging message) from the BS during an available interval and determines whether to transition to normal mode or to stay in the idle mode. Also, the mobile station may notify a paging controller of its location by location update in the idle mode.

The idle mode may be beneficial to the mobile station (MS) by relieving the mobile station of an active requirement for handover and normal operational requirements. The idle mode restricts the MS's activity to scanning during discrete periods, so that the mobile station conserves power and operation resources.

Additionally, the idle mode may benefit a network and a BS by providing a simple and timely scheme for alerting an MS to pending downlink traffic directed toward the MS and by eliminating an air interface and network handover (HO) traffic from an inactive MS.

Paging is a function of, upon generation of an incoming call in mobile communications, locating a mobile station for which the incoming call is destined (e.g. detecting a base station or a Mobile Switching Center (MSC) to which the mobile station belongs). A plurality of base stations supporting the idle mode may be divided into specified paging groups, covering paging areas.

The paging groups are logical groups. The purpose of these paging groups is to offer a contiguous coverage area in which the MS can be paged on a downlink (DL) if there is traffic targeted thereto. Preferably, the paging groups are large enough for a mobile station to spend most of its time within the same paging group and small enough to render paging overhead reasonable.

FIG. 1 shows exemplary paging groups, each of which includes a plurality of base stations.

FIG. 1 shows four paging groups defined in multiple BSs each located at a hexagonal lattice. One paging group may be included in one or more paging groups.

The paging groups are defined in a management system. A paging group may use a paging group-action backbone message. The paging controller uses another backbone network message (paging-announce message), to manage the list of mobile stations in the idle mode and initiate paging of a mobile station on all base stations belonging to a paging group.

A paging group may include one or more base stations, and one BS may be contained in one or more paging groups. The paging groups may be defined in a management system. A paging group may use a paging group-action backbone network message. In addition, a paging controller uses another backbone message (paging-announce message) in order to manage the list of mobile stations in an idle mode and initiate paging of a mobile station on all base stations belonging to a paging group.

If the mobile station requests that the base station enter the idle mode, the base station transmits its own paging group ID to the mobile station, so that the mobile station can enter the idle mode.

Next, a paging procedure and location update method according to the related art will hereinafter be described in detail.

If a paging controller receives an incoming call or packet for the mobile station that stays in the idle mode, the paging controller transmits a paging message to all base stations contained in each paging group, the base stations each having received the paging message broadcast a paging advertisement message to all mobile stations managed by the base stations. Each mobile station receives the paging advertisement message from the base stations during an available interval, so that they determine whether to enter a normal mode or to stay in the idle mode. In other words, if the paging controller pages the mobile station, the mobile station enters the normal mode so that it can communicate with a serving base station.

If a location update condition is satisfied, the MS in the idle mode updates its location. There are a variety of location update conditions, for example, a paging group location update, a timer based location update, a power down location update, and the like.

The paging group location update condition is as follows. If the mobile station moves out of an area of the paging group to which the mobile station belongs and enters another paging group, the mobile station performs location update. The paging group location update condition means that the mobile station performs location update when a location update timer has expired. The power down location update means that the mobile station performs location update before being powered off.

In other words, if the mobile station moves from one paging group to another paging group, it transmits a ranging request (RNG-REQ) message to a target base station so as to perform location update. The target base station having received the RNG-REQ message transmits a ranging response (RNG-RSP) message to the mobile station. In this case, the target base station includes a paging group identifier (PG_ID) in the RNG-RSP message. In addition, the target base station informs a paging controller of a new location of the mobile station.

Recently, various technologies for a femtocell BS have been defined and introduced to cover an indoor space or a shadow area not covered by a macrocell BS. The femtocell is a low-power mini cell area managed by an indoor BS, designed for use in residential and/or small business environments. While the femtocell is used inter-changeably with the term 'picocell', the femtocell is regarded as a more advanced type form of the picocell. The femtocell BS is a small cellular BS that connects to a broadband router. The femtocell BS functions to connect legacy $2^{nd}$ Generation (2G) and/or $3^{rd}$ Generation (3G) voice and data to a backbone network of a mobile communication service provider via a Digital Subscriber Line (DSL) link or the like.

A femtocell base station (BS) may cover an indoor space or a shadow area not covered by the macrocell BS and may support a high data transmission rate. The femtocell BS may be installed in an overlay form within a macrocell or in a non-overlay form in an area uncovered by the macrocell BS.

The femtocell BS is classified into two types: a Closed Subscriber Group (CSG) femtocell BS and an Open Subscriber Group (OSG) femtocell BS. The CSG femtocell BS groups MSs which can access the CSG femtocell BS and assigns a CSG IDentification (ID) to the groped MSs. Only the MSs to which the CSG ID is assigned can access the femtocell BS. The OSG femtocell BS refers to a BS that all MSs can access.

The operation mode of the CSG BS is classified into an open access mode, a closed access mode, and a hybrid access mode.

The femtocell BS in the open access mode can access all users (i.e., all MSs), such that the MS does not compare a CSG ID received from the femtocell BS with a user CSG list of the MS and immediately performs initial entry into the femtocell BS. The user CSG list is a CSG ID list of a femtocell to which the MS may connect, and the MS can manage the user CSG list (or the CSG ID list).

If the femtocell BS is in the closed access mode, only a specific user (or a specific MS) can access the femtocell BS, the MS compares a CSG ID received from the femtocell BS with a user CSG list of the MS, such that it can perform initial entry into the femtocell BS only when the received CSG ID is present in the user CSG list of the MS. The hybrid access mode can be operated in one or both of the open access mode and the closed access mode.

The above-mentioned femtocell has the following advantages.

Recently, a new research paper has proposed a method for the femtocell to expedite the spread of 3G technology and greatly increase indoor coverage. Up to 2012, it is expected that the number of the femtocell BS users throughout the world will increase to about one hundred and two million, and the number of access points (APs) serving as BSs will also increase to about sixty-two million. The femtocell can strengthen the cell coverage and increase the quality of a voice service. Also, mobile communication service providers may provide subscribers with a variety of data services through femtocells, such that the subscribers can be easily accustomed to the 3G technology.

In other words, the communication system based on the femtocell may improve cell coverage, facilitate infrastructure installation with lower cost as compared to a general BS, and accelerate Fixed Mobile Convergence (FMC).

One or more femtocell BSs are grouped according to specific services or groups so as to constitute a femtocell group. For example, a femtocell group that can access only a specific MS may be referred to as a Closed Subscriber Group (CSG). A femtocell BS (FBS) recognizes a CSG ID of the MS so that it allows access of only the MS subscribed to the CSG.

FIG. 2 shows an example of a femtocell arrangement structure for use in an overlay network.

Referring to FIG. 2, a backbone network of the femtocell BS is directly connected to an Internet Service Provider (ISP) network connected by wire, and a Femtocell GateWay (FGW) may be located at an access point between the backbone network and the ISP network. The FGW may be used as an access point for communication with a Macrocell (or Macro) Base Station (MBS).

The FGW may be directly connected to femtocell BSs, or may be located between a core network and an ISP network so as to be an integrated server for each ISP. In addition, the system may guarantee its communication with a macrocell (or macro) BS (MBS) through a CNS GW or an ASN GW irrespective of the location of the FGW. In the overlay network, the MBS may transmit/receive or store some or all information units for FBSs.

If femtocell BS configuration is completed, the MBS may recognize other information including FBS location information. Therefore, the MBS may directly communicate with the FBS through an air interface.

In this case, the macro BS including a Home Femto BS of an MS and a Closed Subscriber Group (CSG) femto BS may be referred to as an Overlay Macro BS.

FIG. 3 shows an example of a femtocell arrangement structure in a non-overlay network.

If many users are temporarily crowded at a boundary among MBSs in a non-overlay structure, FBSs may be installed at a boundary among macrocells. In this case, the MBS may not store all information of FBSs therein. At this time, the FGW may serve as an access point where the FGW can communicate with the MBS in the same manner as in the overlay structure.

The femtocell BS has small coverage. Thus, if location update is performed whenever the femtocell BS moves out of the femtocell area, the number of location updates is excessively increased.

DISCLOSURE OF INVENTION

Technical Problem

As described above, as a femtocell is recently introduced, a location update is needed when an idle-mode MS moves from a femtocell to a macrocell, moves from a macrocell to a femtocell, or moves from one femtocell to another femtocell.

Accordingly, the present invention is directed to a location update method for use in a wireless communication system that substantially obviates one or more problems due to limitations and disadvantages of the related art.

An object of the present invention devised to solve the problem lies on a method for effectively performing location update, when an idle mode MS moves from a femtocell to a macrocell, moves from a macrocell to a femtocell, or moves from one femtocell to another femtocell.

It will be appreciated by persons skilled in the art that the objects that can be achieved with the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for performing a location update in a mobile station (MS) of a wireless communication system including a femtocell includes receiving a deregistration command (DREG-CMD) message that includes not only a paging group identifier (ID) of a first femtocell base station (BS) in which the MS stays but also a paging group ID of a macro BS including the first femtocell BS, initiating a location update delay timer while the MS moves from the first femtocell area to a second femtocell area having a paging group ID different from that of the first femtocell, and performing location update according to an operation of the location update delay timer.

In another aspect of the present invention, provided herein is a method for performing a location update in a mobile station (MS) of a wireless communication system including a femtocell, the method including receiving a deregistration command (DREG-CMD) message including a paging group identifier (ID) of a first femtocell base station (BS) in which the MS stays, initiating a location update delay timer while the MS moves from the first femtocell area to a second femtocell area, and performing location update according to an operation of the location update delay timer, wherein the paging group ID of the first femtocell is identical to that of the second femtocell, and a closed subscriber group (CSG) of the first femtocell is different from that of the second femtocell.

In another aspect of the present invention, provided herein is a method for performing a location update in a mobile station (MS) of a wireless communication system including a femtocell, the method including receiving a deregistration command (DREG-CMD) message that includes not only a paging group identifier (ID) of a first femtocell base station (BS) in which the MS stays but also a paging group ID of a macro BS including the first femtocell BS, initiating a location update delay timer while the MS moves from the first femtocell area to an area of the macro BS; and performing location update according to an operation of the location update delay timer.

In another aspect of the present invention, provided herein is a method for performing location update in a femtocell environment, the method including receiving a deregistration command (DREG-CMD) message including a first paging group identifier (ID) of a first area and a second paging group ID of a second area from a base station (BS), establishing, by a mobile station (MS), a first timer to perform the location update, moving the MS from the first area to the second area, and establishing, by the MS, a second timer to delay the location update for a predetermined time.

The method may further include performing, by the MS, the location update in the second area when the second timer has expired.

The method may further include performing the location update in the second area when the first timer has expired before the expiration of the second timer.

The method may further include allowing the MS not to perform the location update, if the MS returns to the first area before the expiration of the second timer and the first timer is not expired.

The first area may be a macrocell area, the first paging group ID may be a macro paging group ID, the second area may be a femtocell area, and the second paging group ID may be a femto paging group ID. Alternatively, the first area may be a femtocell area, the first paging group ID may be a femto paging group ID, the second area may be a macrocell area, and the second paging group ID may be a macro paging group ID.

The first paging group ID and the second paging group ID may be correlated with each other.

In another aspect of the present invention, provided herein is a method for performing location update in a femtocell environment, the method including receiving a deregistration command message from a mobile station (MS), and transmitting a deregistration command including a first paging group identifier (ID) of a first area and a second paging group ID of a second area to the MS, wherein a first timer for delaying the location update for a predetermined time is established when the MS moves from the first area to the second area.

The method may further include performing, by the MS, the location update in the second area when the first timer has expired.

The first area may be a macrocell area, the first paging group ID may be a macro paging group ID, the second area may be a femtocell area, and the second paging group ID may be a femto paging group ID. Alternatively, the first area may be a femtocell area, the first paging group ID may be a femto paging group ID, the second area may be a macrocell area, and the second paging group ID may be a macro paging group ID.

The first paging group ID and the second paging group ID may be correlated with each other.

Next, an apparatus and method for supporting or performing an idle mode operation in a wireless access system will hereinafter be described.

In another aspect of the present invention, provided herein is a method for performing an operation of an idle mode by a mobile station (MS), the method including transmitting an idle mode request message for requesting an entry of the idle mode to a first base station (BS), receiving an idle mode command message including first paging information from the first BS, transmitting a ranging request (RNG-REQ) message to a second BS so as to perform a location update to the second BS, and receiving a ranging response (RNG-RSP) message including second paging information from the second BS, wherein at least one of the first paging information and the second paging information includes a parameter for two-step paging.

In the first embodiment, the two-step paging parameter may include at least one of a first paging offset, a second paging offset, a closed subscriber group (CSG) femtocell paging group ID, and a macrocell paging group ID.

In the first embodiment, the method may further include monitoring a paging message at the first paging offset.

In the first embodiment, the method may further include monitoring a paging message at the second paging offset.

In the first embodiment, the first BS may be a macro BS, and the second BS may be a closed subscriber group (CSG) femto BS. Needless to say, the first BS may be a CSG femto BS and the second BS may be a macro BS as necessary.

In the first embodiment, each of the idle mode request message and the idle mode command message may further include a timer (e.g., P timer) parameter that indicates a predetermined time during which the location update is not performed although the MS moves out of a paging area.

In the first embodiment, each of the ranging request (RNG-REQ) message and the ranging response (RNG-RSP) message may further include a timer (e.g., P timer) parameter that indicates a predetermined time during which the location update is not performed although the MS moves out of a paging area.

In another aspect of the present invention, provided herein is a method for supporting an operation of an idle mode of a mobile station (MS), the method including receiving, by a first base station (BS), an idle mode request message for requesting an entry of the idle mode from the MS, transmitting, by the first BS, an idle mode command message including first paging information to the MS, receiving, by a second BS, a ranging request message for performing location update from the MS, and transmitting, by the second BS, a ranging response message including second paging information to the MS. At least one of the first paging information and the second paging information may include a parameter for two-step paging.

In the second embodiment, the two-step paging parameter may include at least one of a first paging offset, a second paging offset, a closed subscriber group (CSG) femtocell paging group ID, and a macrocell paging group ID.

In the second embodiment, the method may further include, transmitting, by the first BS, a paging message to the MS at a first paging offset.

In the second embodiment, the method may further include, transmitting, by the second BS, a paging message to the MS at a second paging offset.

In the second embodiment, each of the ranging request message and the ranging response message may further include a timer parameter that indicates a predetermined time during which the location update is not performed although the MS moves out of a paging area.

In the second embodiment, the first BS may be a macro BS, and the second BS may be a closed subscriber group (CSG) femto BS. Needless to say, the first BS may be a CSG femto BS and the second BS may be a macro BS as necessary.

In another aspect of the present invention, provided herein is a mobile station (MS) for performing an operation of an idle mode including an antenna for transmitting and receiving a message, a transmission module for transmitting the message by controlling the antenna, a reception module for receiving the message by controlling the antenna, a memory for storing information related to the idle mode operation, and a processor for controlling the transmission module, the reception module, and the memory. The processor may control the transmission module and the reception module, so that it transmits an idle mode request message for requesting an entry of the idle mode to a first base station (BS), receives an idle mode command message including first paging information from the first BS, transmits a ranging request message to a second BS so as to perform location update to the second BS, and receives a ranging request message including second paging information from the second BS, and at least one of the first paging information and the second paging information includes a parameter for two-step paging.

In the third embodiment, the two-step paging parameter may include at least one of a first paging offset, a second paging offset, a closed subscriber group (CSG) femtocell paging group ID, and a macrocell paging group ID.

In the third embodiment, the processor may monitor a paging message at a time of at least one of the first paging offset and the second paging offset.

In the third embodiment, the first BS may be a macro BS and the second BS may be a CSG femto BS. Needless to say, the first BS may be a CSG femto BS and the second BS may be a macro BS.

Each of the idle mode request message and the idle mode command message may further include a timer parameter that indicates a predetermined time during which the location update is not performed although the MS moves out of a paging area.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings Advantageous Effects Exemplary embodiments of the present invention have the following effects.

First, the embodiments of the present invention can reduce the number of location updates of the MS.

Second, the embodiments of the present invention can reduce overhead needed for paging message transmission of the BS.

Third, the embodiments of the present invention can effectively perform location update when the MS moves from a femtocell to a macrocell, moves from a macrocell to a femtocell, or moves from one femtocell to another femtocell.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings. For convenience of description and better understanding of the present invention, some parts unrelated to the inventive concept of the present invention will be omitted herein. Wherever possible, the same reference numbers will be used throughout the drawings to refer to the same or like parts.

Throughout the entirety of the specification of the present invention, if it is assumed that a certain part includes a certain component, the term 'including' means that a corresponding component may further include other components unless a specific meaning opposed to the corresponding component is written. In addition, another term ' . . . part', ' . . . unit', 'module' or the like means a unit for processing at least one function or operation, and this unit may be implemented by hardware, software, or a combination thereof.

A method for controlling an MS to enter an idle mode and a paging procedure in a wireless communication system according to embodiments of the present invention will hereinafter be described with reference to FIG. 4.

Figure 1:
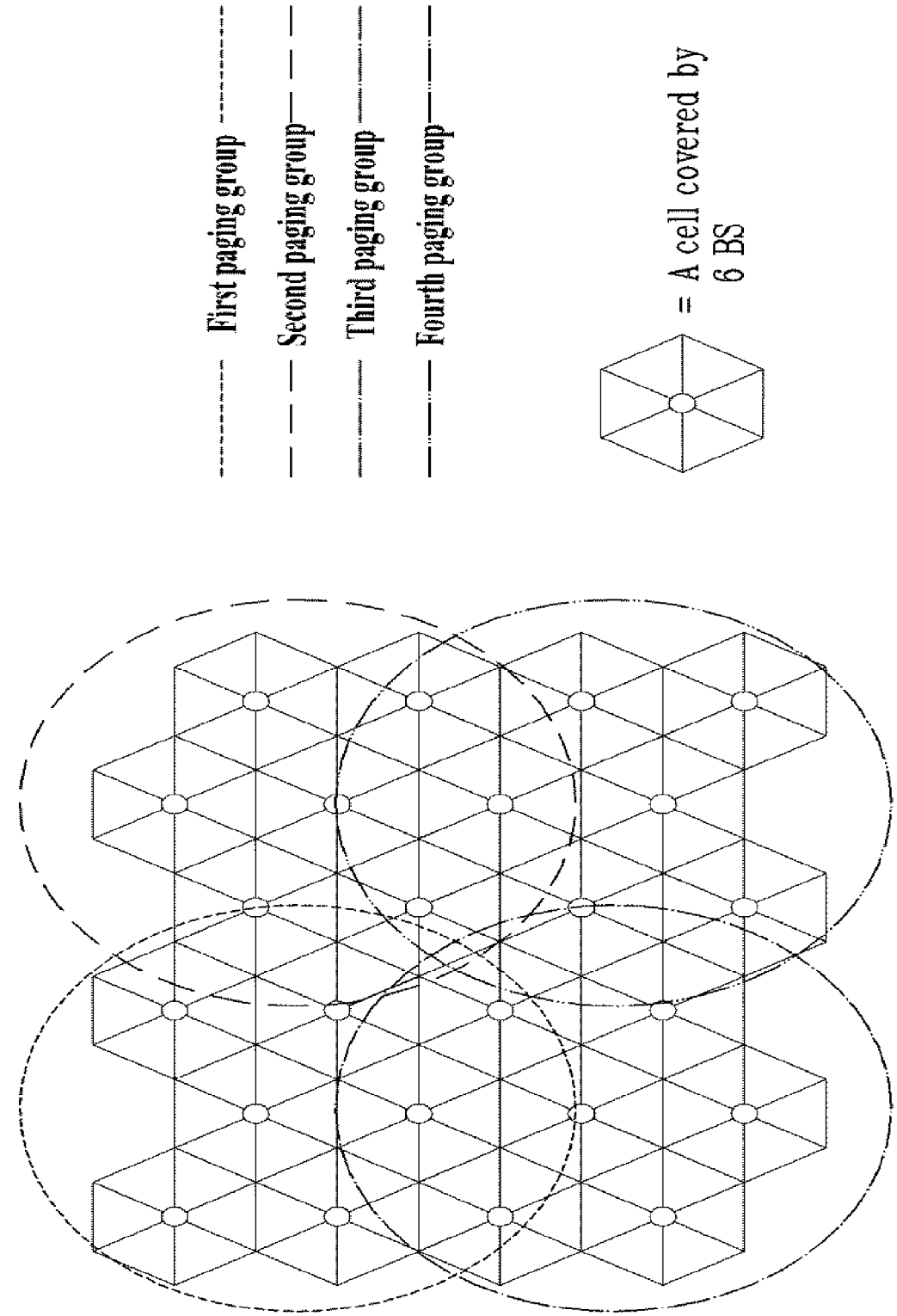
FIG. 1 shows exemplary paging groups, each of which includes a plurality of base stations.
Figure 2:
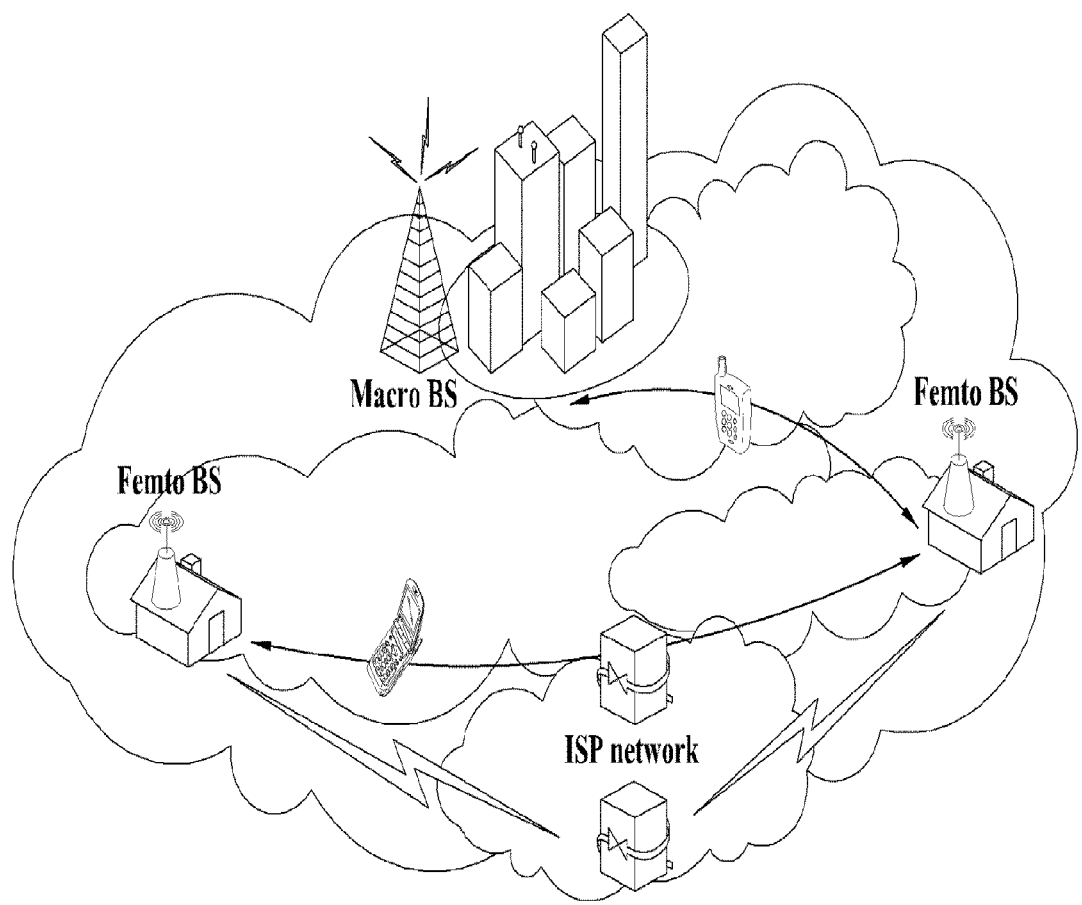
FIG. 2 shows an example of a femtocell arrangement structure for use in an overlay network.
Figure 3:
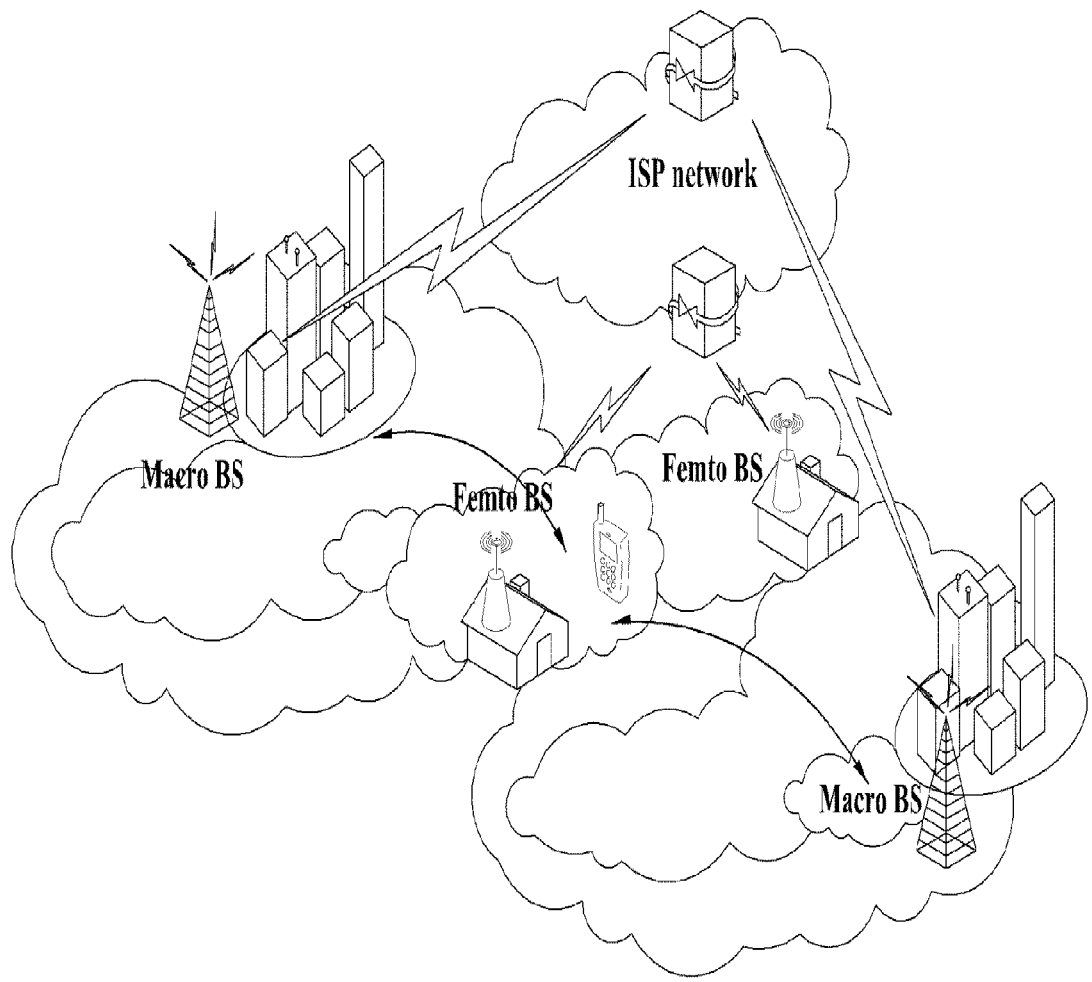
FIG. 3 shows an example of a femtocell arrangement structure in a non-overlay network.
Figure 4:
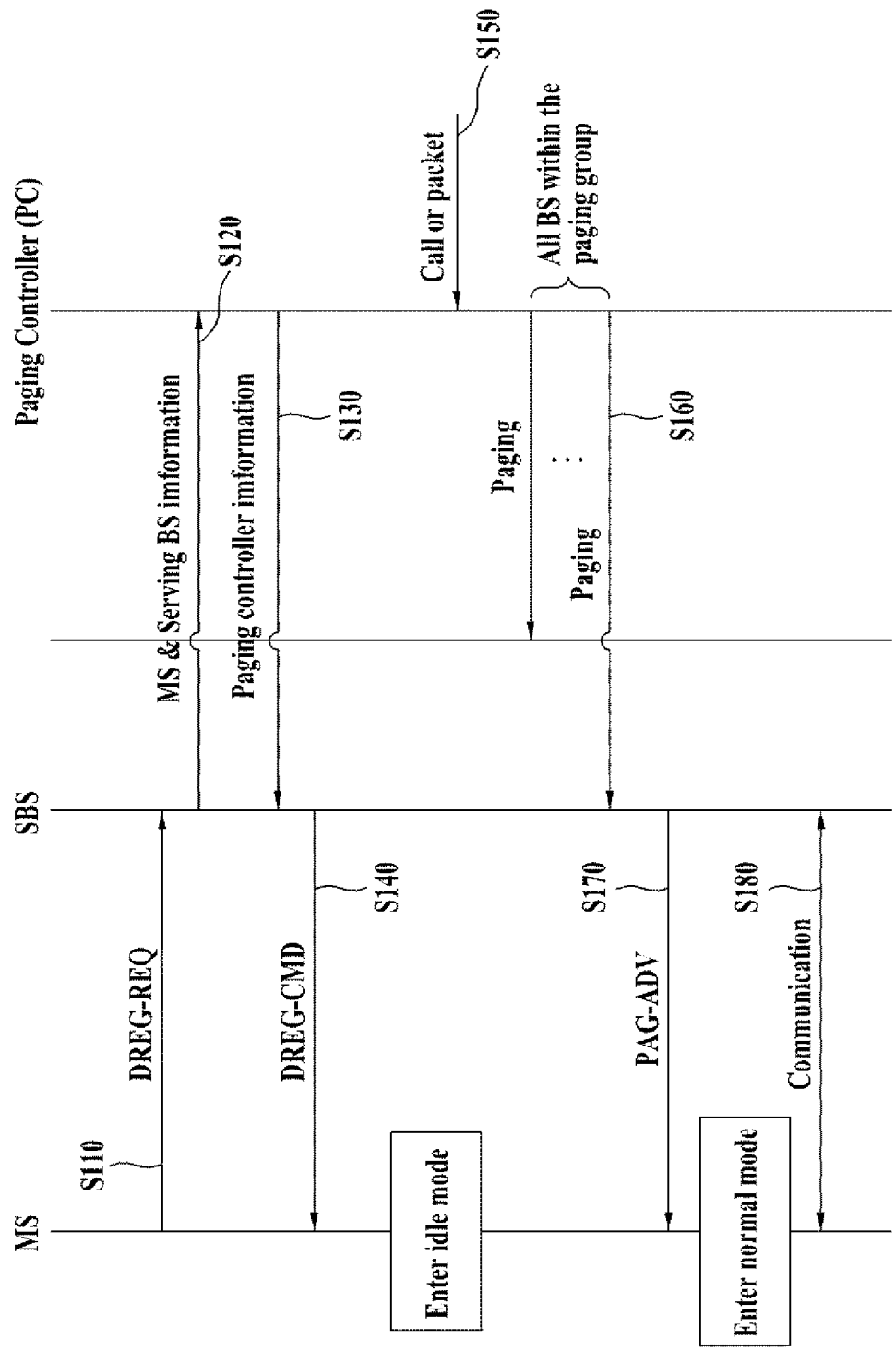
FIG. 4 is a flowchart illustrating an MS idle mode entry procedure and a paging procedure according to embodiments of the present invention.

FIG. 4 is a flowchart illustrating an MS's idle mode entry procedure and a paging procedure according to embodiments of the present invention.

In an idle mode, paging may be performed on a paging group basis. For instance, an MS may be a member of one or more paging groups. In each paging group, upon receipt of an incoming call for an MS or a packet directed to the MS from an external network, a paging controller pages the MS to detect it. For the paging, specifically, the paging controller may transmit a paging message to all BSs within the paging group and, upon receipt of the paging message, each BS broadcasts a Mobile Paging Advertisement (MOB_PAG-ADV) message to MSs.

Referring to FIG. 4, an MS transmits a deregistration request (DREG-REQ) message to a serving BS (SBS) currently communicating with the MS to transition from a normal mode to an idle mode at step S101. That is, while the MS communicates with a femtocell BS, it transmits the DREG-REQ message to the femtocell BS. While the MS communicates with a macrocell BS, it transmits the DREG-REQ message to the macrocell BS (also called 'macro BS').

The SBS having received the DREG-REQ message transmits MS information and SBS information to the paging controller at step S120. In this case, the MS information may be a Media Access Control (MAC) address of the MS, and the SBS information may be an SBS ID.

The paging controller transmits information related to the paging controller to the SBS at step S130.

The SBS transmits a deregistration command (DREG-CMD) message to the MS in response to the DREG-REQ message at step S140.

The following Table 1 shows the DREG-CMD message that is transferred from a femtocell BS when the MS communicating with the femtocell BS enters an idle mode.

TABLE 1

| Syntax | Size (Bit) | Notes |
|---|---|---|
| MOB_DREG-CMD_Message_format( ){ ~ | — | — |
| F_PGID | Variable | Femto BS paging group ID |
| M_PGID | Variable | Overlay Macro BS paging group ID |
| Femto BS paging offset (primary paging offset) | Variable | |
| Overlay Macro BS paging offset (secondary paging offset) | Variable | |
| }//End of MOB_DREG-CMD | | |

Referring to Table 1, the DREG-CMD message transferred from the femtocell BS may include a Femtocell BS Paging Group Identification (F_PGID), an Overlay Macro BS paging group ID (M_PGID), a Femtocell BS paging offset, and an Overlay Macro BS paging offset.

The F_PGID may be decided based on a CDG to which the femtocell BS belongs. For example, femtocell BSs contained in the same CSG may use the same F_PGID.

The M_PGID is a paging group ID of a macrocell to which the femtocell belongs. The femtocell BS simultaneously transmits the F_PGID and the M_PGID to the MS, so that it enables the MS to have correlation between the F_PGID and the M_PGID.

The femtocell BS paging offset indicates a specific time at which the MS begins to monitor a paging message transferred from a femtocell's paging group. The overlay macro BS paging offset indicates a specific time at which the MS begins to monitor a paging message transferred from a macrocell's paging group.

The DREG-CMD message may further include a paging cycle and a paging listening interval.

The MS receives a paging message through femtocell paging information in the femtocell area. Until the MS performs location update after having moved out of the femtocell area, the MS monitors the paging message through macrocell paging information.

In addition, when the MS performs location update from the macrocell to the femtocell, the MS receives paging information of the femtocell BS and paging information of the macrocell BS through a ranging response (RNG-RSP) message shown in Table 2. After the MS performs the location update, it receives a paging message through femtocell paging information in a femtocell area. After that, until the MS performs location update after having moved out of the femtocell area, the MS monitors a paging message through macrocell paging information.

TABLE 2

| Syntax | Size (Bit) | Notes |
|---|---|---|
| RNG-RSP_Message_format( ){ ~ | — | — |
| F_PGID | Variable | Femto BS paging group ID |
| M_PGID | Variable | Overlay Macro BS paging group ID |
| Femto BS paging offset (primary paging offset) | Variable | |
| Overlay Macro BS paging offset (secondary paging offset) | Variable | |
| } //End of RNG-RSP | | |

The following Table 3 shows the DREG-CMD message that is transferred from a macrocell BS when the MS communicating with the macrocell BS enters an idle mode.

TABLE 3

| Syntax | Size (bit) | Notes |
|---|---|---|
| MOB_DREG-CMD_Message_format( ){ ~ | — | |
| M_PGID | Variable | Overlay Macro BS paging group ID |
| Overlay Macro BS paging offset (primary paging offset) | Variable | |
| The number of CSG Femto BS | | |
| For (i=1; i < The number of CSG Femto BS; i++) { | | |
| F_PGID | Variable | Femto DS paging group ID |
| } ~ | | |
| } //End of MOB_DREG-CMD | | |

Referring to Table 2, the DREG-CMD message transferred from the macrocell BS may include a macrocell BS paging group (M_PGID), an Overlay Macro BS paging offset of the M_PGID, and a paging group of a home femtocell BS of an MS. That is, the macrocell BS simultaneously transmits the F_PGID and the M_PGID to the MS, so that it enables the MS to have correlation between the F_PGID and the M_PGID.

For example, provided that two home femtocell BSs of the MS are installed in the macrocell area and the two home femtocell BSs have different CSGs, the macrocell BS transmits the M_PGID and two F_PGIDs to the MS through the DREG-CMD message, so that it enables the MS to have correlation between the M_PGID and the two P_PGIDs.

The MS having recognized the DREG-CMD message enters the idle mode. The MS in the idle mode may receive a paging message on the basis of paging information received through the DREG-CMD message.

If the paging controller receives an incoming call or packet for the MS that stays in the idle mode at step S150, the paging controller transmits a paging message to all BSs contained in each paging group at step S160. The BSs each having received the paging message broadcast a paging advertisement (PAG-ADV) message to all MSs managed by the BSs contained in a primary paging group at step S170. Each MS receives the PAG-ADV message from the BSs, enters the normal mode, and communicates with the serving BS at step S180.

If the paging controller receives an incoming call or packet for the MS, the paging controller transmits a paging message through femtocell BSs at the femtocell BS paging offset, such that it can search for the MS using the paging message. If the paging controller does not receive a response to the paging message, the paging controller transmits a paging message through a macrocell BS at the overlay macrocell BS paging offset.

If the location update condition is satisfied, the MS in the idle mode performs location update. There are a variety of location update conditions, for example, a paging group location update, a timer based location update, a power down location update, a MAC hash skip threshold update, and the like.

The timer based location update means that the MS performs location update when a location update timer (hereinafter referred to as 'T timer') has expired.

The paging group location update is carried out when the MS moves out of a paging group to which the MS belongs and then enters an area of another paging group. In order to prevent the MS from frequently performing location update, although the MS moves from a femtocell area to a macrocell area, moves from a macrocell area to a femtocell area, or moves from one femtocell area to another femtocell area, the location update method according to embodiments of the present invention does not immediately perform location update, but performs such location update after a predetermined time has elapsed from when the MS began to move. In this case, a predetermined timer may be used for the above location update. For the convenience of description, the predetermined timer will be referred to as a paging group location update timer (PG_LU_TIMER) or a location update delay timer. In this case, it is preferable that a time value of the P timer be shorter than that of the T timer.

Figure 5:
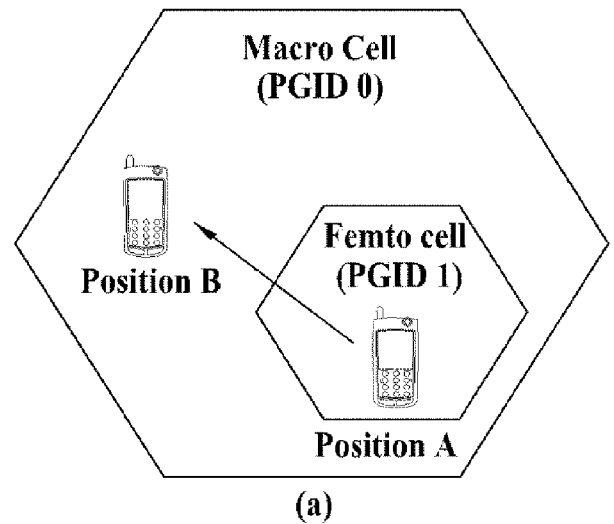
FIG. 5(a) is a conceptual diagram illustrating that an MS moves from a home femtocell area to a macrocell area according to embodiments of the present invention.
FIG. 5(b) is a conceptual diagram illustrating a location update method when an MS moves from a home femtocell area to a macrocell area according to embodiments of the present invention.
Figure 5:
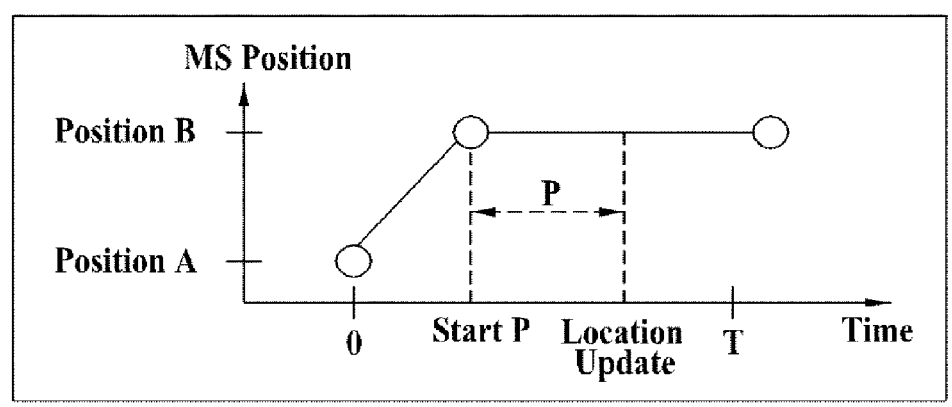

Next, a location update method when the MS moves from the home femtocell area to the macrocell area according to embodiments of the present invention will hereinafter be described with reference to FIGS. 5 to 7.

FIG. 5(a) is a conceptual diagram illustrating that an MS moves from a home femtocell area to a macrocell area according to embodiments of the present invention. FIG. 5(b) is a conceptual diagram illustrating a location update method when an MS moves from a home femtocell area to a macrocell area according to embodiments of the present invention.

Referring to FIG. 5(a), the F_PGID indicating a femtocell paging group ID is set to 1, the M_PGID indicating a macrocell paging group ID is set to 0, and the femtocell is present in the macrocell area, so that there is a correlation between the F_PGID and the M_PGID.

Referring to FIGS. 5(a) and 5(b), if the MS moves from the position A of the femtocell to the position B of the macrocell, an MS shown in the related art moves from a paging group area having the paging group ID of 1 to another paging group area having the paging group ID of 0, so that the MS needs to perform location update. In contrast to the related art, if an MS shown in the embodiments of the present invention moves to a paging group that correlates with the MS, the MS starts operation of the P timer without immediately performing location update.

The MS monitors a paging message at the overlay macrocell BS paging offset while the P timer is operated. In addition, if the MS has not returned to an area of a paging group having the F_PGID of 1 when the P timer has expired, the MS performs location update.

As described above, FIG. 5 has illustrated that a paging group ID of the femtocell is different from a paging group ID of the macrocell. Although the paging group ID of the femtocell is identical to the paging group ID of the macrocell, if the MS moves from a femtocell area to a macrocell area, the location update is also carried out.

Figure 6:
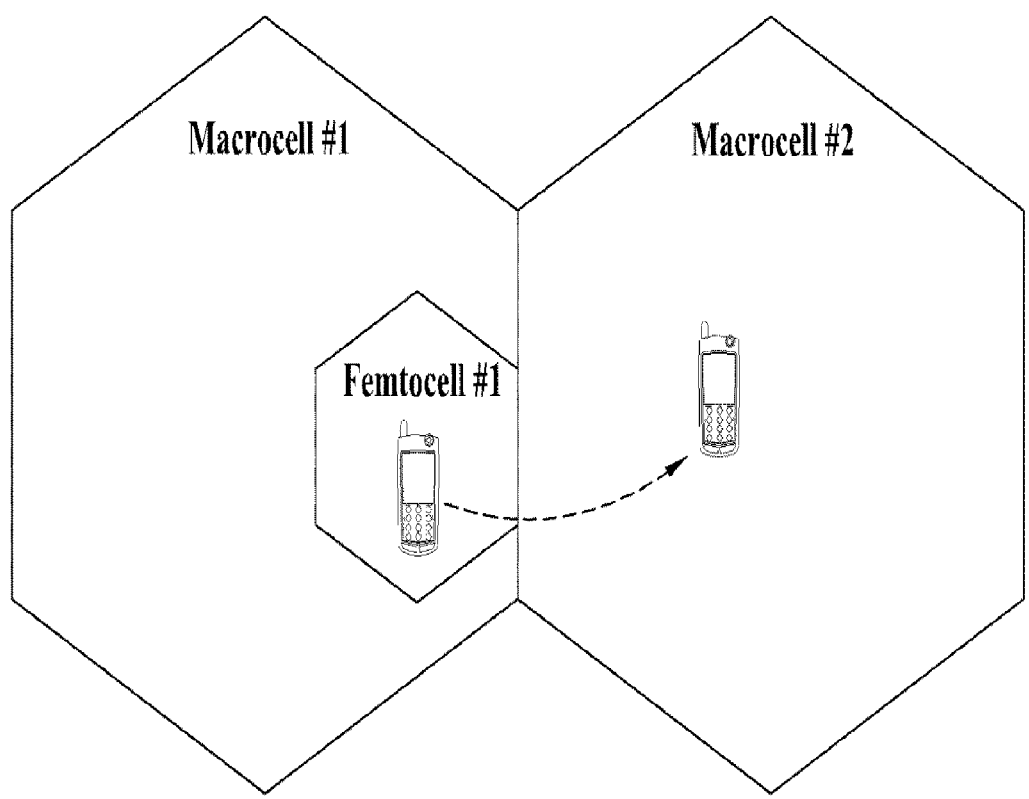
FIG. 6 is a conceptual diagram illustrating that an MS moves from a femtocell area to a macrocell of a paging group unrelated to a paging group of a femtocell according to embodiments of the present invention.

FIG. 6 is a conceptual diagram illustrating that an MS moves from a femtocell area to a macrocell of a paging group unrelated to a paging group of a femtocell according to embodiments of the present invention. Referring to FIG. 6, the MS moves from the femtocell area to the macrocell #2 instead of the macrocell #1 serving as the home macrocell. In this case, since the MS has moved to a paging group unrelated to the MS, the MS directly performs location update without driving the P timer.

Figure 7:
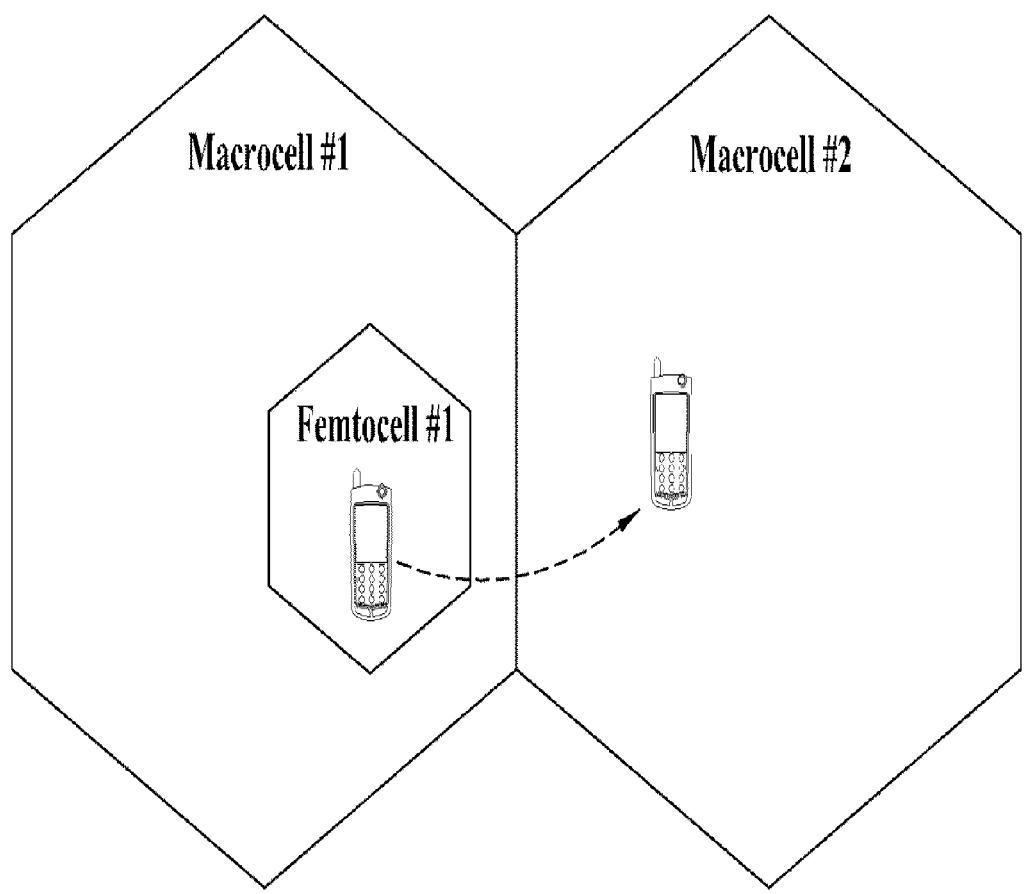
FIG. 7 is a conceptual diagram illustrating that an MS moves from a femtocell area to a home macrocell area and then moves to a macrocell of a paging group unrelated to a paging group of a femtocell according to embodiments of the present invention.

FIG. 7 is a conceptual diagram illustrating that an MS moves from a femtocell area to a macrocell of a paging group unrelated to a paging group of a femtocell according to embodiments of the present invention. Referring to FIG. 6, the MS moves from the femtocell area to the macrocell #2 instead of the macrocell #1 serving as the home macrocell. In this case, since the MS moves to a paging group unrelated to the MS, the MS directly performs location update without driving the P timer.

FIG. 7 is a conceptual diagram illustrating that an MS moves from a femtocell area to a home macrocell area and then moves to a macrocell of a paging group unrelated to a paging group of a femtocell according to embodiments of the present invention. In this case, when the MS moves from the femtocell area to the home macrocell area, the P timer starts. And, if the MS moves to a macrocell area of a paging group unrelated to the paging group of the femtocell before the P timer has expired, the MS immediately performs location update and stops operations of the P timer.

Figure 8:
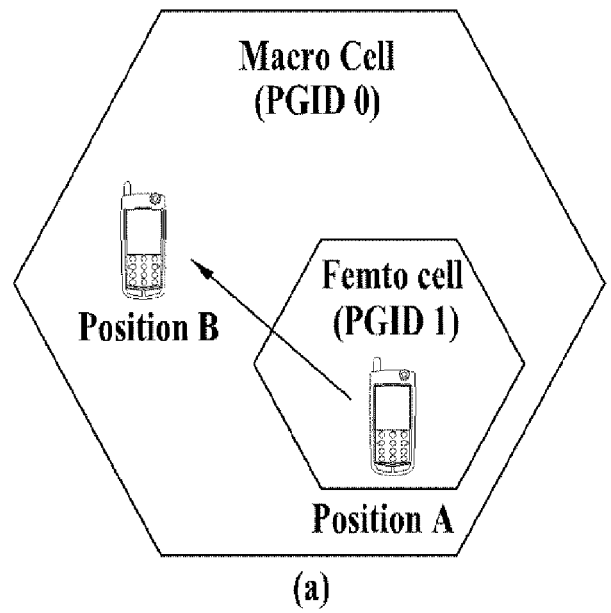
FIG. 8(a) is a conceptual diagram illustrating that an MS moves from a home femtocell area to a macrocell area according to embodiments of the present invention.
FIG. 8(b) is a conceptual diagram illustrating a location update method when a timer T has expired before the expiration of a timer P according to embodiments of the present invention.
Figure 8:
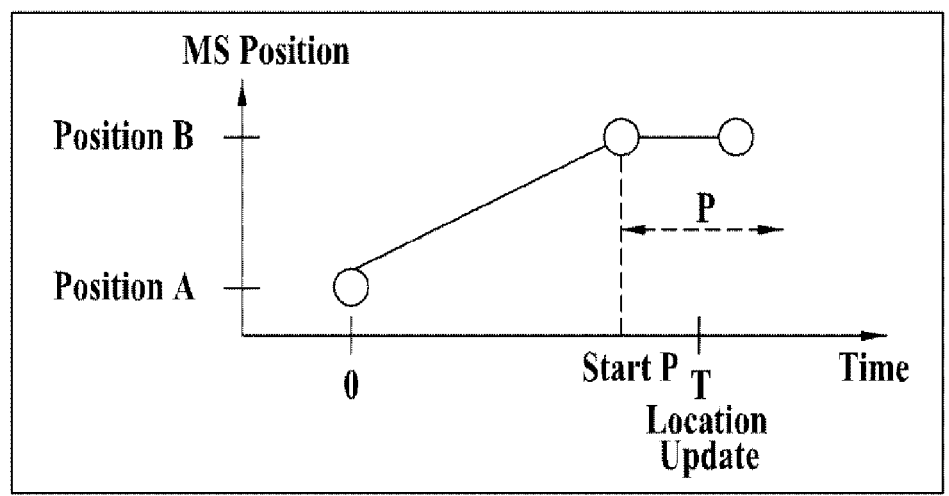

FIG. 8(a) is a conceptual diagram illustrating that an MS moves from a home femtocell area to a macrocell area according to embodiments of the present invention. FIG. 8(b) is a conceptual diagram illustrating a location update method when a timer T has expired prior to the expiration of a timer P according to embodiments of the present invention.

Referring to FIG. 8(a), the F_PGID indicating a femtocell paging group ID is set to 1, the M_PGID indicating a macrocell paging group ID is set to 0, and the femtocell is present in the macrocell area, so that there is a correlation between the F_PGID and the M_PGID.

Referring to FIGS. 8(a) and 8(b), if the MS moves from the position A of the femtocell to the position B of the macrocell, an MS shown in the related art moves from a paging group area having the paging group ID of 1 to another paging group area having the paging group ID of 0, so that the MS needs to perform location update. In contrast to the related art, if an MS shown in the embodiments of the present invention moves to a paging group that correlates with the MS, the MS starts operation of the P timer without immediately performing location update.

Referring to FIG. 8(b), if the T timer used for the timer based location update has expired before the expiration of the P timer, the MS performs location update and stops operation of the P timer.

Figure 9:
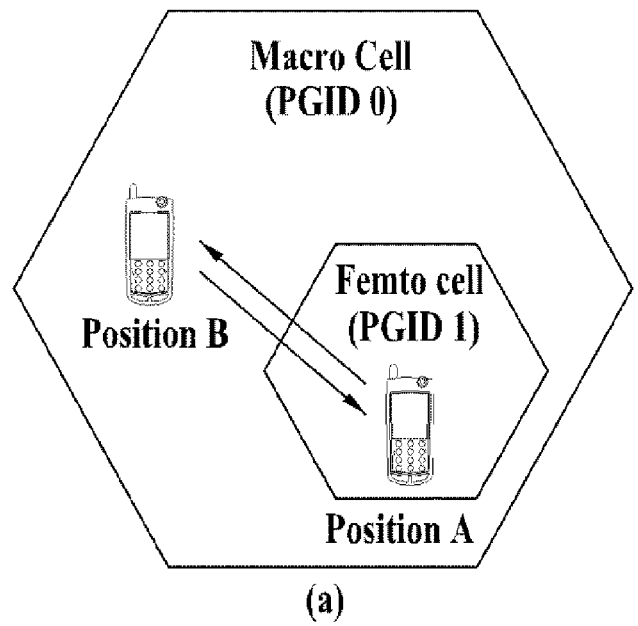
FIG. 9(a) is a conceptual diagram illustrating that an MS moves from a home femtocell area to a macrocell area and then returns to the home femtocell area according to embodiments of the present invention.
FIG. 9(b) is a conceptual diagram illustrating a location update method when an MS returns to the home femtocell area prior to the expiration of a timer P according to embodiments of the present invention.
Figure 9:
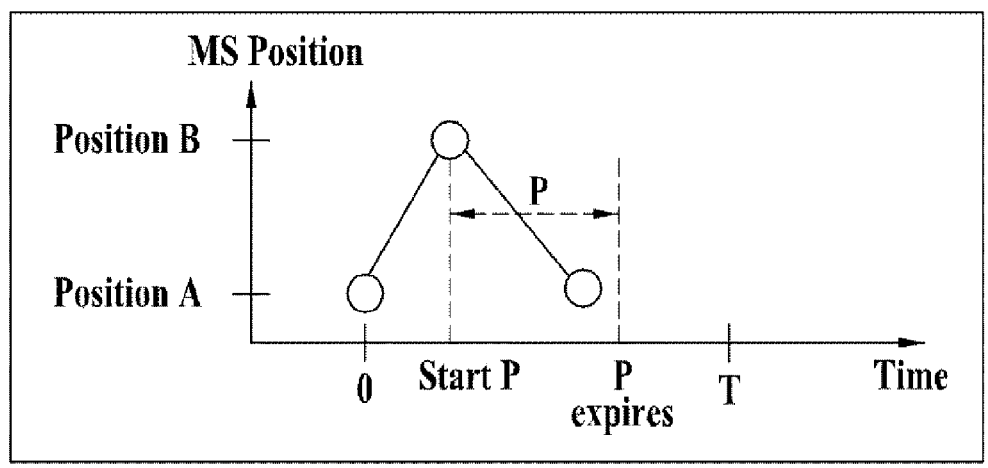

FIG. 9(a) is a conceptual diagram illustrating that an MS moves from a home femtocell area to a macrocell area and then returns to the home femtocell area according to embodiments of the present invention. FIG. 9(b) is a conceptual diagram illustrating a location update method when an MS returns to the home femtocell area prior to the expiration of a timer P according to embodiments of the present invention.

Referring to FIG. 9(a), the F_PGID indicating a femtocell paging group ID is set to 1, the M_PGID indicating a macrocell paging group ID is set to 0, and the femtocell is present in the macrocell area, so that there is a correlation between the F_PGID and the M_PGID.

Referring to FIGS. 9(a) and 9(b), if the MS moves from the position A of the femtocell to the position B of the macrocell, an MS shown in the related art moves from a paging group area having the paging group ID of 1 to another paging group area having the paging group ID of 0, so that the MS needs to perform location update. In contrast to the related art, if an MS shown in the embodiments of the present invention moves to a paging group that correlates with the MS, the MS starts operation of the P timer without immediately performing location update.

Referring to FIG. 9(b), if the MS returns to the femtocell area before the expiration of the P timer, the MS releases the P timer without performing location update.

Figure 10:
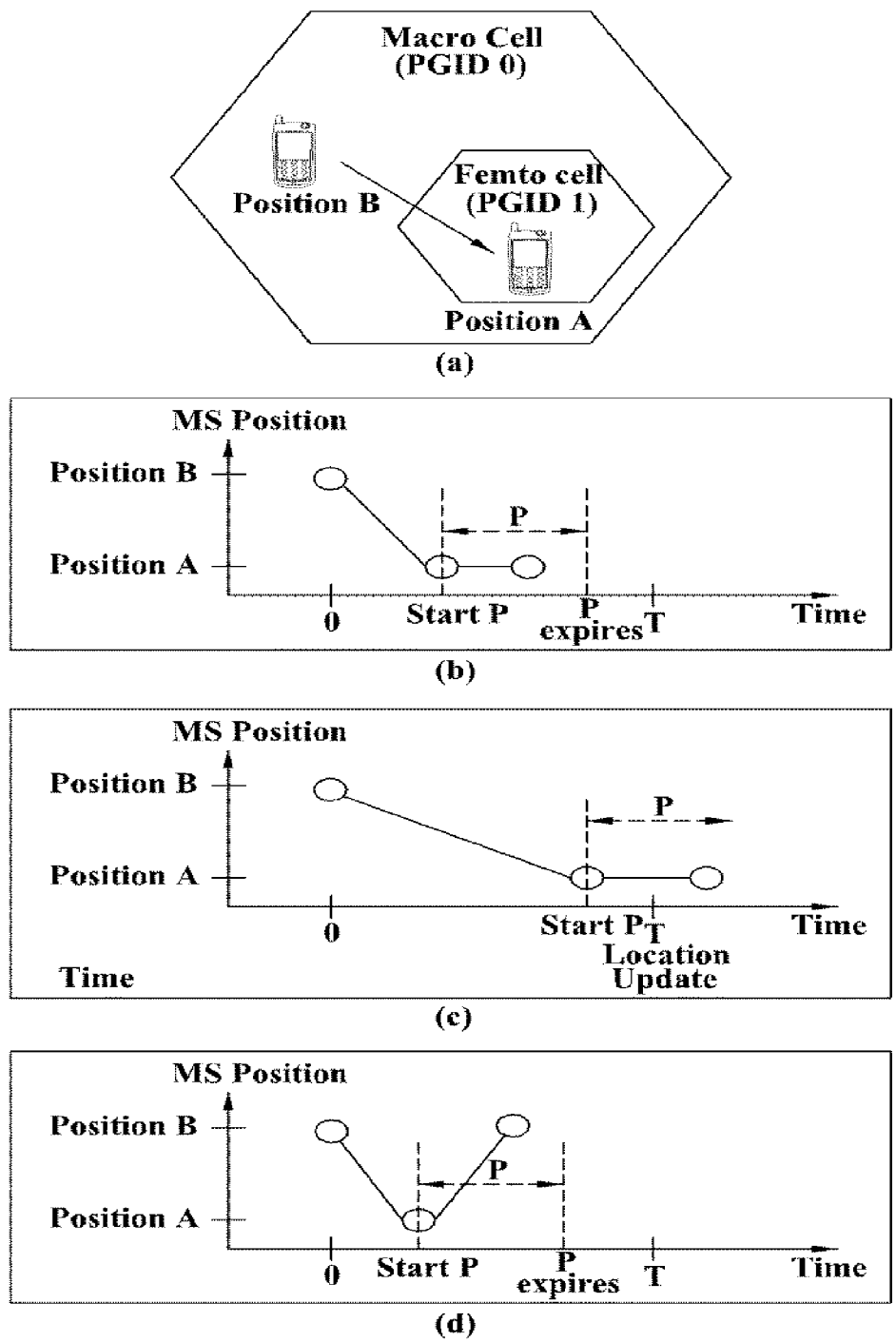
FIG. 10(a) is a conceptual diagram illustrating that an MS moves from a macrocell area to a home femtocell area according to embodiments of the present invention.
FIG. 10(b) is a conceptual diagram illustrating a location update method when an MS moves from a home femtocell area to a macrocell area according to embodiments of the present invention.
FIG. 10(c) is a conceptual diagram illustrating a location update method when a timer T has expired prior to the expiration of a timer P according to embodiments of the present invention.
FIG. 10(d) is a conceptual diagram illustrating a location update method when an MS returns to the home femtocell area prior to the expiration of a timer P according to embodiments of the present invention.

Next, a location update method when the MS moves from the macrocell area to the home femtocell area according to the embodiments of the present invention will hereinafter be described with reference to FIG. 10.

FIG. 10(a) is a conceptual diagram illustrating that an MS moves from a macrocell area to a home femtocell area according to embodiments of the present invention. FIG. 10(b) is a conceptual diagram illustrating a location update method when an MS moves from a home femtocell area to a macrocell area according to embodiments of the present invention. FIG. 10(c) is a conceptual diagram illustrating a location update method when a timer T has expired prior to the expiration of a timer P according to embodiments of the present invention. FIG. 10(d) is a conceptual diagram illustrating a location update method when an MS returns to the home femtocell area prior to the expiration of a timer P according to embodiments of the present invention.

Referring to FIG. 10(a), the F_PGID indicating a femtocell paging group ID is set to 1, the M_PGID indicating a macrocell paging group ID is set to 0, and the femtocell is a home femtocell and is in the macrocell area, such that there is a correlation between the F_PGID and the M_PGID.

Referring to FIGS. 10(a) and 10(b), if the MS moves from the position B of the macrocell to the position A of the femtocell, an MS shown in the related art moves from a paging group area having the paging group ID of 0 to another paging group area having the paging group ID of 1, so that the MS needs to perform location update. In contrast to the related art, if an MS shown in the embodiments of the present invention moves to a paging group that correlates with the MS, the MS starts operation of the P timer without immediately performing location update.

Referring to FIG. 10(b), if the MS has not returned to an area of the paging group having the M_PGID of 0 upon expiration of the P timer, the MS performs location update. In this case, the T timer established when the MS enters the idle mode may be updated or released. In addition, if the MS moves to an area of a paging group unrelated to the PGID of 1 before the expiration of the P timer, the MS immediately performs location update.

Referring to FIG. 10(c), if the T timer used for the timer based location update has expired before the expiration of the P timer, the MS performs location update and releases the P timer.

Referring to FIG. 10(d), if the MS returns to a femtocell area before the expiration of the P timer, the MS releases the P timer without performing location update.

Figure 11:
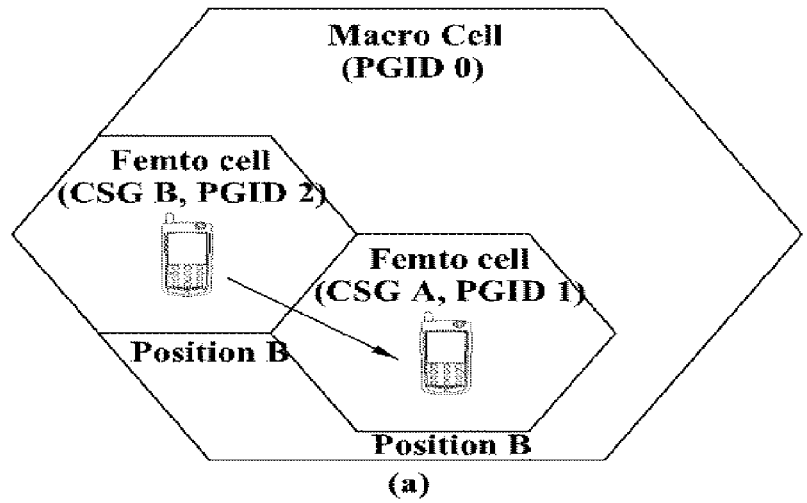
FIG. 11(a) is a conceptual diagram illustrating that an MS moves from a home femtocell area to another femtocell area having a PGID and a CSG different from those of the home femtocell area according to embodiments of the present invention.
FIG. 11(b) is a conceptual diagram illustrating a location update method when an MS moves from a home femtocell area to another femtocell area having a PGID and a CSG different from those of the home femtocell area according to embodiments of the present invention.
FIG. 11(c) is a conceptual diagram illustrating a location update method when a timer T has expired prior to the expiration of a timer P according to embodiments of the present invention.
FIG. 11(d) is a conceptual diagram illustrating a location update method when an MS returns to the home femtocell area prior to the expiration of a timer P according to embodiments of the present invention.
Figure 11:
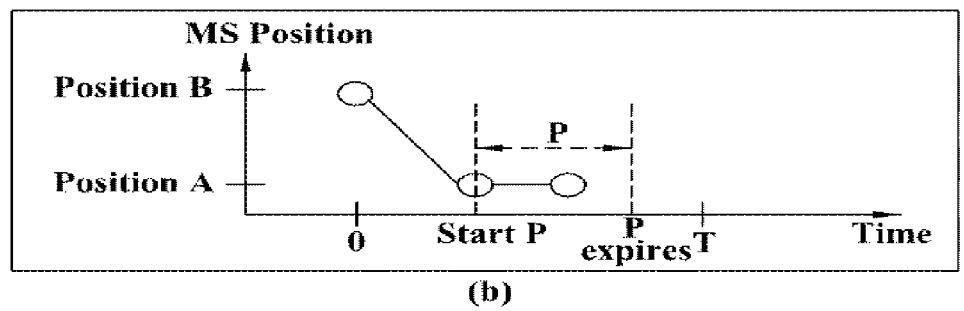
Figure 11:
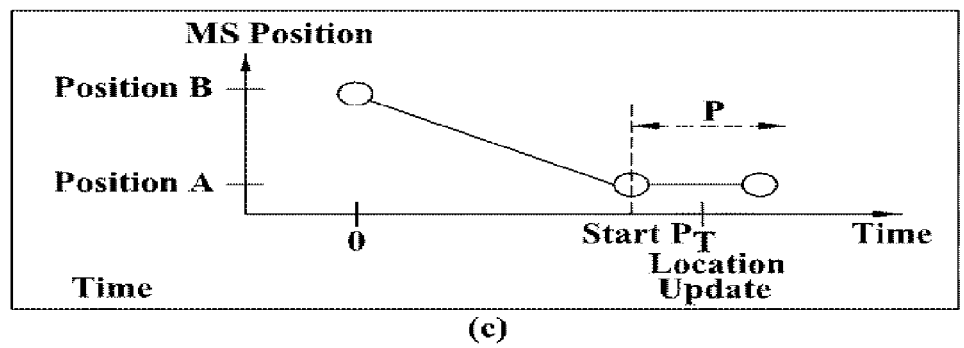
Figure 11:
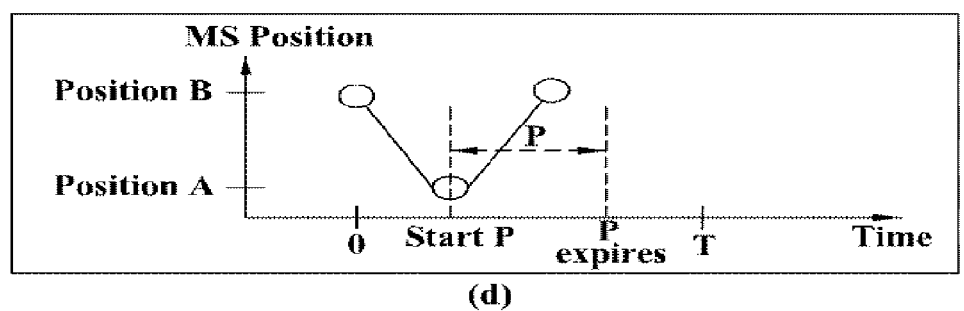

Next, a location update method when the MS moves from one femtocell area to another femtocell area according to the embodiments of the present invention will hereinafter be described with reference to FIGS. 11 to 12.

First, a location update method when the MS moves from a home femtocell area to a femtocell area having a PGID and CSG different from those of the home femtocell according to the embodiments of the present invention will hereinafter be described with reference to FIG. 11.

FIG. 11(a) is a conceptual diagram illustrating that an MS moves from a home femtocell area to another femtocell area having a PGID and a CSG different from those of the home femtocell area according to embodiments of the present invention. FIG. 11(b) is a conceptual diagram illustrating a location update method when an MS moves from a home femtocell area to another femtocell area having a PGID and a CSG different from those of the home femtocell area according to embodiments of the present invention. FIG. 11(c) is a conceptual diagram illustrating a location update method when a timer T has expired prior to the expiration of a timer P according to embodiments of the present invention. FIG. 11(d) is a conceptual diagram illustrating a location update method when an MS returns to the home femtocell area prior to the expiration of a timer P according to embodiments of the present invention.

Referring to FIGS. 11(a) to 11(d), if the MS moves from a home femtocell that has a paging group ID of 2 and a CSG of B to a femtocell that has a paging group ID of 1 and a CSG of A, the MS starts operation of the P timer and performs location update to a macrocell according to the operation of the P timer.

In other words, as shown in FIG. 11(b), if the MS has not returned to the area of the paging group having the M_PGID of 2 upon expiration of the P timer, the MS performs location update. As shown in FIG. 11(c), if the T timer used for the timer based location update has expired before the expiration of the P timer, the MS immediately performs location update and releases the P timer. After that, as shown in FIG. 11(d), if the MS returns to the femtocell area before the expiration of the P timer, the MS releases the P timer without performing location update.

Next, a location update method when the MS moves from a home femtocell area to a femtocell area having the same PGID and CSG as those of the home femtocell according to embodiments of the present invention will hereinafter be described with reference to FIG. 12.

Figure 12:
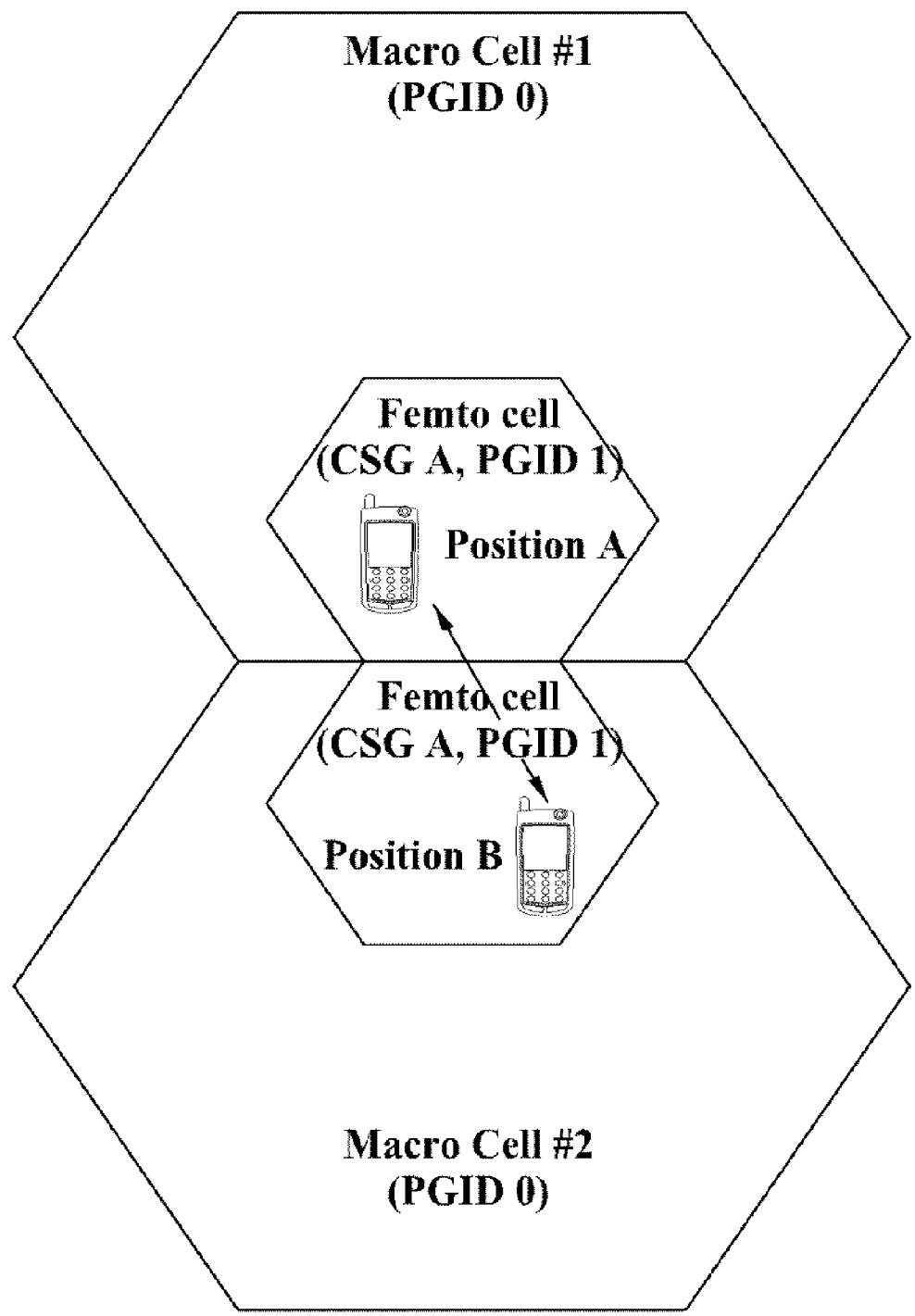
FIG. 12 is a conceptual diagram illustrating that an MS moves from a home femtocell area to another femtocell area having the same PGID and CSG as those of the home femtocell area according to embodiments of the present invention.

FIG. 12 is a conceptual diagram illustrating that an MS moves from a home femtocell area to another femtocell area having the same PGID and CSG as those of the home femtocell area according to embodiments of the present invention. If the MS moves from a first home femtocell area to a second home femtocell area having the same PGID and CSG as those of the first home femtocell area, the MS does not perform location update. Referring to FIG. 12, even when the macrocell including the first home femtocell is different from a macrocell including the second home femtocell and the MS moves between the macrocells, the MS does not performs location update.

In addition, if it is assumed that a macrocell BS bound with the home femtocell BS is a home macrocell BS and the home femtocell BS is bound with two or more home macrocell BSs, the P timer starts operation when the MS moves from each area of the home femtocell BSs to each area of the home macrocell BSs. After that, if the MS has not returned to a paging group area of the home femtocell BS when the P timer has expired, the MS performs location update.

If the paging controller receives an incoming call or packet for the MS, the paging controller transmits a paging message through femtocell BSs at the femtocell BS paging offset, such that it can search for the MS using the paging message. If the paging controller does not receive a response to the paging message, the paging controller transmits a paging message through a macrocell BS at the overlay macrocell BS paging offset.

Figure 13:
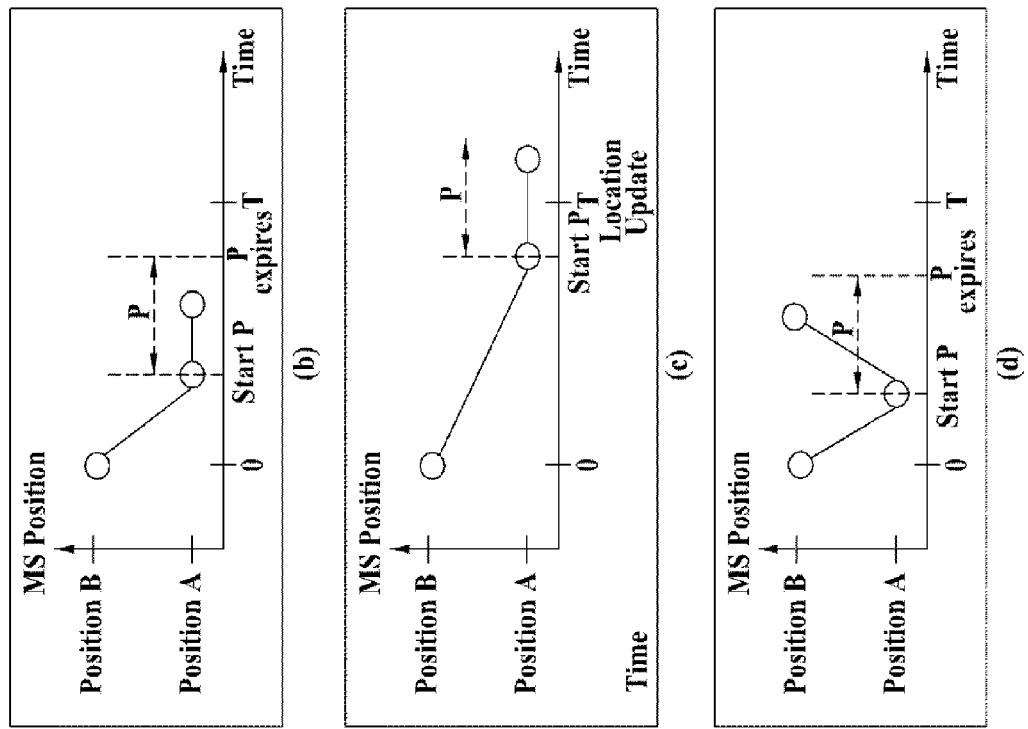
FIG. 13(a) is a conceptual diagram illustrating that an MS moves from a home femtocell area to another femtocell area having the same PGID and a different CSG as the home femtocell area according to embodiments of the present invention.
FIG. 13(b) is a conceptual diagram illustrating a location update method when an MS moves from a home femtocell area to another femtocell area having the same PGID and a different CSG as the home femtocell area according to embodiments of the present invention.
FIG. 13(c) is a conceptual diagram illustrating a location update method when a timer T has expired prior to the expiration of a timer P according to embodiments of the present invention.
FIG. 13(d) is a conceptual diagram illustrating a location update method when an MS returns to the home femtocell area prior to the expiration of a timer P according to embodiments of the present invention.
Figure 13:
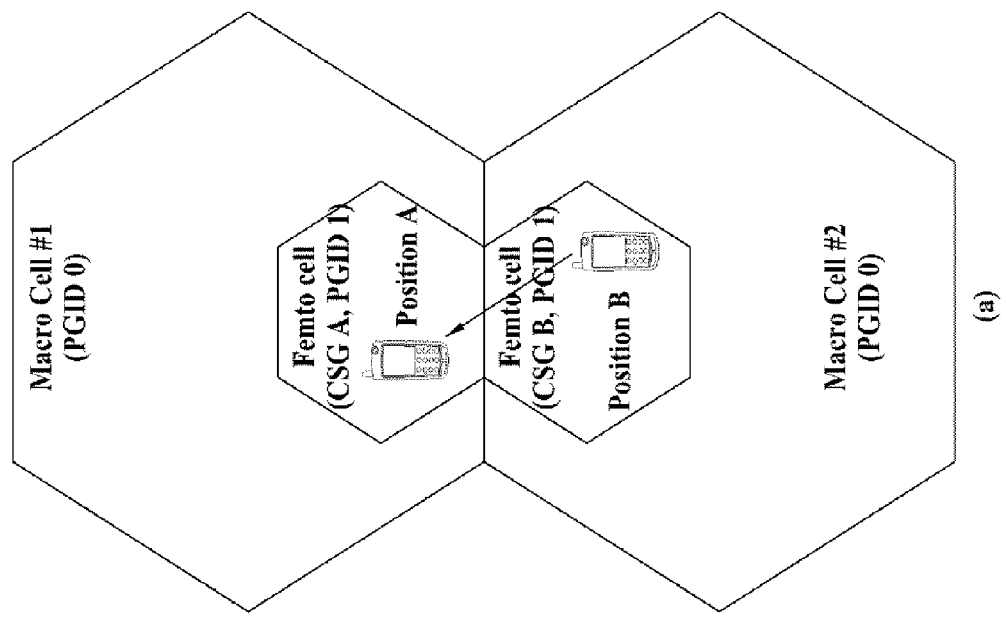

Next, a location update method when the MS moves from a home femtocell area to another femtocell area having the same PGID and a different CSG as the home femtocell area according to embodiments of the present invention will hereinafter be described with reference to FIG. 13.

FIG. 13(a) is a conceptual diagram illustrating that an MS moves from a home femtocell area to another femtocell area having the same PGID and a different CSG as the home femtocell area according to embodiments of the present invention. FIG. 13(b) is a conceptual diagram illustrating a location update method when an MS moves from a home femtocell area to another femtocell area having the same PGID and a different CSG as the home femtocell area according to embodiments of the present invention. FIG. 13(c) is a conceptual diagram illustrating a location update method when a timer T has expired prior to the expiration of a timer P according to embodiments of the present invention. FIG. 13(d) is a conceptual diagram illustrating a location update method when an MS returns to the home femtocell area prior to the expiration of a timer P according to embodiments of the present invention.

Referring to FIG. 13(a), the MS moves from the location B to the location A, and each of the location B and the location A has the PGID of 1. In this case, since the MS has moved to the area having the same PGID according to the related art, the MS does not update its location.

However, many PGIDs are needed for the femtocell, so that the PGIDs can be reused. Particularly, if two femtocells having the same PGID are adjacent to each other, the two femtocells may have different paging cycles and different paging offsets, and the MS, that has moved from one femtocell area to the other femtocell area having the same PGID and a different paging offset as in the one femtocell area, is unable to receive the paging message.

Therefore, if the MS moves from a home femtocell area to a femtocell area having the same PGID and a different CSG as the home femtocell area, the MS performs location update using the P timer.

The MS may recognize a femtocell CSG through a broadcast channel (BCH), additional system information, or an advertisement (MOB_PAG-ADV) message.

Table 4 shows an example of the MOB_PAG-ADV message transferred from the femtocell BS.

TABLE 4

| Syntax | Size (bit) | Notes |
| --- | --- | --- |
| MOB_PAG-ADV_Message_format( ) { | — | — |
| ~ | | |
| BS ID | | |
| CSG ID | | |
| ~ | | |
| } //End of MOB_PAG-ADV | | |

Referring to Table 4, the MOB_PAG-ADV message transferred from the femtocell BS may include not only a femtocell BS ID (base station ID, BS ID) but also an ID of a CSG supported by the femtocell BS.

If the MS moves from one femtocell area to another femtocell area having the same PGID and a different CSG as the home femtocell area, the P timer starts operation. As shown in FIG. 13(b), if the MS has not returned to an area of the CSG A upon expiration of the P timer, the MS performs location update. As shown in FIG. 13(c), if the T timer used for the timer based location update has expired before the expiration of the P timer, the MS performs location update and releases the P timer. As shown in FIG. 13(d), if the MS returns to an area of the CSG A before the P timer has expired, the MS releases the P timer without performing location update.

Figure 14:
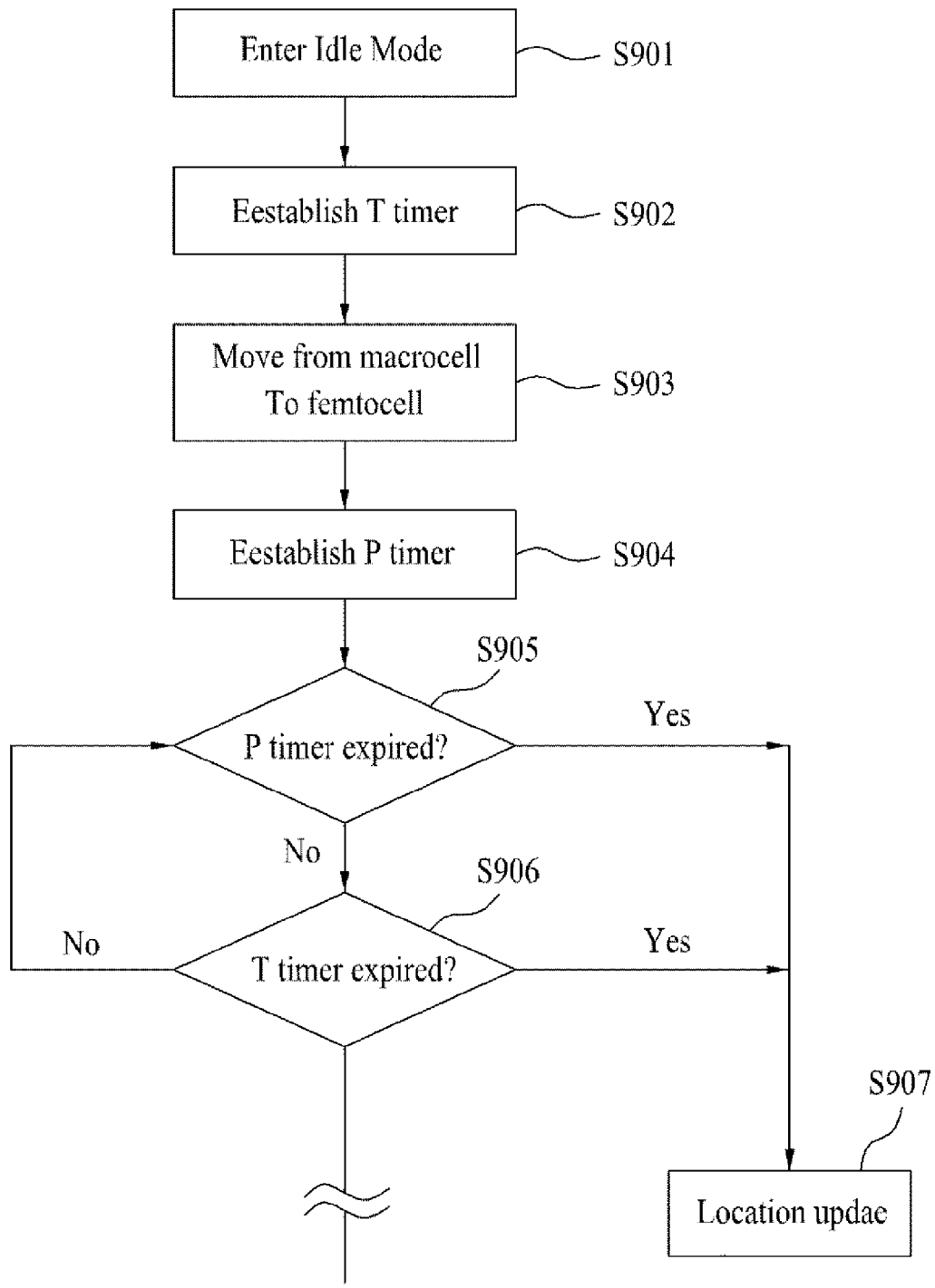
FIG. 14 is a flowchart illustrating one example of location update methods based on a timer of an MS according to another embodiment of the present invention.

FIG. 14 is a flowchart illustrating one example of location update methods based on a timer of an MS according to another embodiment of the present invention.

Referring to FIG. 14, the MS may enter the idle mode. In this case, the serving BS may be a macrocell BS (MBS) (also called a macro BS) or a femtocell BS (FBS) (also called a femto BS).

After the MS enters the idle mode, it may establish a location update timer (T timer) at step S902.

The MS may determine whether the timer has expired or not while performing various operations. For example, the mobile station may determine whether the T timer has expired or not while moving from one cell area to another cell area. If the T timer has expired, the MS can perform location update. The MS may continuously stay in the idle mode until the T timer expires.

Prior to the expiration of the T timer, the MS may move from a macrocell to a femtocell, move from a femtocell to a macrocell, and/or move between femtocells at step S903.

If the paging ID of the macrocell correlates with that of the femtocell, the MS may establish the location update delay timer (i.e., the P timer) without performing the location update although the paging group is changed to another. In addition, if the MS registers as a member in one or more femtocells and individual femtocells are correlated with one another, the MS may establish the P timer without performing location update although the paging group is changed to another at step S904.

The MS may determine whether the P timer has expired or not at step S905.

If the P timer has expired, the MS may perform location update to a macrocell BS or femtocell BS of a corresponding area at step S907.

If the P timer has not expired, the MS determines whether the T timer has expired or not at step S906. If the T timer has not expired, the MS may remain in the idle mode. In this case, another event may occur instead of a timer condition. In this case, the MS may perform a corresponding event operation after disregarding the timer operations. Needless to say, the MS may perform location update to a corresponding BS even when the T timer has expired at step S907.

Now a description will be made of an MS and a BS for implementing the above-described exemplary embodiments of the present invention, according to an exemplary embodiment of the present invention.

The MS may operate as a transmitter on an uplink and as a receiver on a downlink, while the BS may operate as a receiver on the uplink and as a transmitter on the downlink. That is, each of the MS and the BS may include a transmitter and a receiver for transmission and reception of information or data.

The transmitter and the receiver may include processors, modules, parts, and/or means for implementing the exemplary embodiments of the present invention. Especially, the transmitter and the receiver may include a module (means) for performing operations of the idle mode, a module for operating the timer, an antenna for transmitting and receiving messages, etc.

In accordance with exemplary embodiments of the present invention, the MS may include a low-power Radio Frequency/Intermediate Frequency (RF/IF) module. Also, the MS may include means, modules, or parts for performing control, MAC frame variable control according to service characteristics and a propagation environment, handover, authentication and encryption, packet modulation and demodulation for data transmission, high-speed packet channel coding, and real-time modem control, in order to implement the exemplary embodiments of the present invention.

The BS may transmit data received from an upper layer to the MS by wire or wirelessly. The BS may include a low-power RF/IF module. In addition, the BS may perform a control function for implementing the above-described exemplary embodiments of the present invention, Orthogonal Frequency Division Multiple Access (OFDMA) packet scheduling, Time Division Duplex (TDD) packet scheduling and channelization, a variable MAC frame control function based on service characteristics and a propagation environment, a real-time high-speed traffic control function, a handover function, an authentication and encryption function, a packet modulation/demodulation function for data transmission and reception, a high-speed packet channel coding function, a real-time MODEM control function, etc., by at least one of the above-described modules, or the BS may further include an additional module, part or means for performing these functions.

The location update procedure available for other embodiments of the present invention will hereinafter be described in detail.

Figure 15:
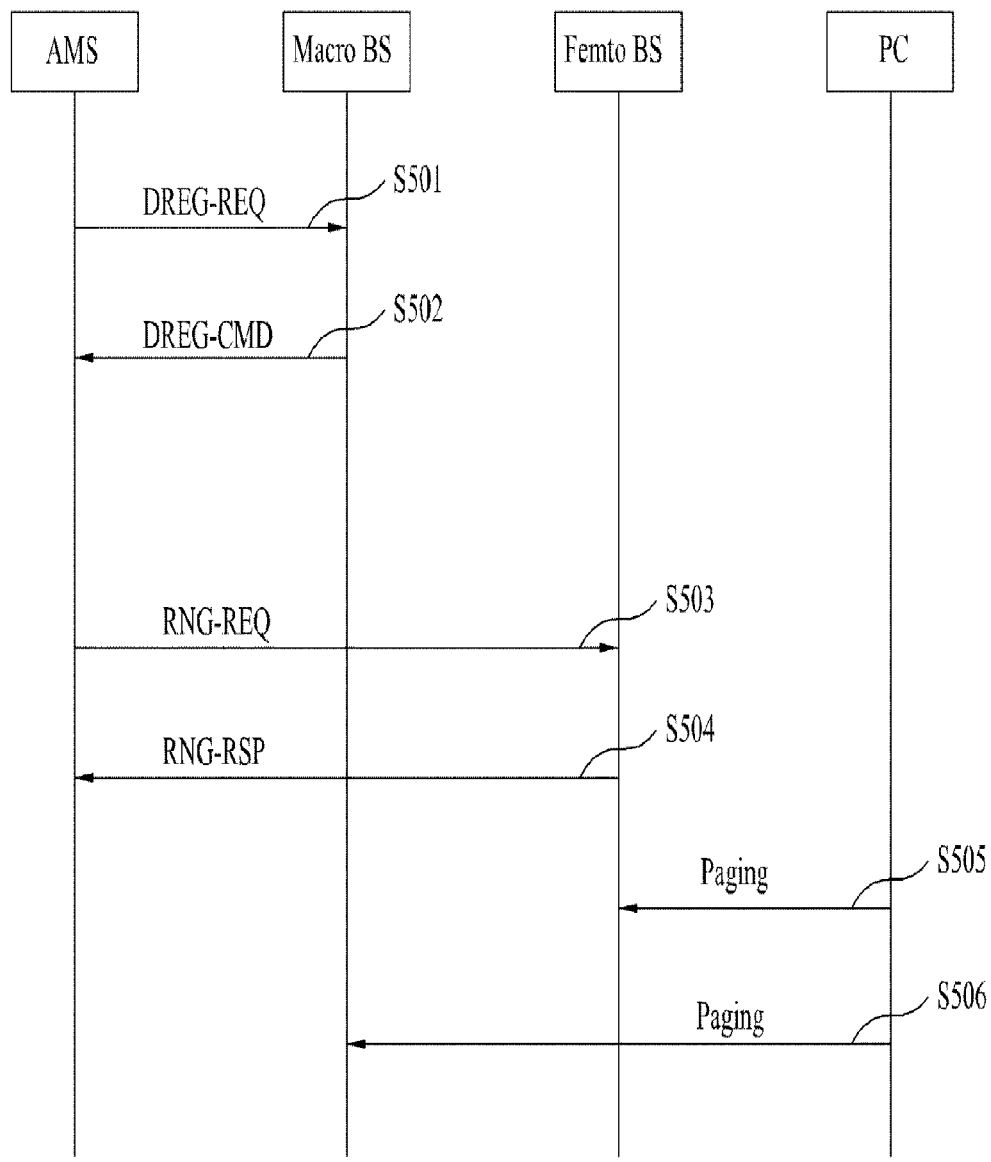
FIG. 15 is a flowchart illustrating a method for performing two-step paging according to one embodiment of the present invention.

FIG. 15 is a flowchart illustrating a method for performing two-step paging according to one embodiment of the present invention.

FIG. 15 is a flowchart illustrating an operation of an Advanced Mobile Station (AMC) that enters a macro BS according to embodiments of the present invention. In addition, it is assumed that a macro BS includes a Closed Subscriber Group (CSG) femto BS that supports a CSG to which the MS belongs.

In FIG. 15, the BS or the paging controller may carry out two-step paging.

For example, if the macro BS includes a CSG femto BS, the paging controller may transmit a paging message to the CSG femto BS or the macro BS. In this case, the paging controller need not transmit the paging message to both a femto BS instead of the CSG femto BS and a macro BS having no CSG femto BS. Therefore, paging message overhead added to the network can be effectively reduced. A two-step paging transmission method will hereinafter be described in detail with reference to FIG. 15.

In order to request an idle mode entry, the AMS transmits a DREG-REQ message to the macro BS at step S501.

In the embodiments of the present invention, a paging offset validity timer (hereinafter referred to as a P timer) may be selectively used. The P timer indicates a predetermined time during which the AMS does not perform location update, on the condition that the MS moves from a cell area of the macro BS (i.e., a macrocell area) to a cell area of the femto BS (i.e., a femtocell area) or moves from the femtocell area to the macrocell area. In the embodiments of the present invention, the term 'P timer' is disclosed only for illustrative purposes, and other timers capable of performing the same function as the P timer may indicate the same timer although different terms are used.

That is, although the MS satisfies a location update condition (e.g., the MS moves from a macro BS to a CSG femto BS), the MS does not perform location update while the P timer is operated, so that resources are not wasted for unnecessary location updates.

At step S501, if the MS supports the P timer, the DREG-REQ message including a parameter of the P timer is transmitted to the macro BS. If the MS does not support the P timer, the MS may transmit the DREG-REQ message that does not include the P timer parameter to the macro BS. It is assumed that the P timer is used in the embodiments of the present invention.

The macro BS transmits a DREG-CMD message including the P timer parameter and the paging information to the AMS at step S502.

The following Table 5 shows an example of the DREG-CMD message used at Step S502.

TABLE 5

| Syntax | Size (bit) | Notes |
|---|---|---|
| MOB_DREG-CMD_Message_format( ) { ~ | — | — |
| P timer (Primary paging offset validity timer) | | When the AMS moves from its CSG femtocell area to another area, the P timer is operated. When the AMS remains in the moved area after the expiration of the P timer, Location Update (LU) is performed. P timer == 0 {although AMS moves out of the CSG femtocell, the AMS receives a paging message through a second paging offset without performing LU. Namely, the P timer can be optionally used} |
| Paging Information{ Macro BS PG ID For (i=0; I < the number of MS's CSG home femtocell BS; i++) { MS CSG Femtocell BS PG ID } Paging Cycle | | |
| primary paging offset(femtocell paging offset) | | Time at which paging message transmitted from a small paging area (CSG Femto Cell area) is monitored |
| secondary paging offset(macro paging offset) | | Time at which a paging message transmitted from a large paging area (Overlay Macro Cell area) is monitored |
| Paging listening interval } ~ } //End of MOB_DREG-CMD | | Paging message monitoring time |

Referring to Table 5, the DREG-CMD message may include the P timer and the paging information. In this case, the paging information may include a Macro BS PGID, a CSG femtocell BS PGID, a paging cycle, a first paging offset (e.g., femtocell paging offset), a second paging offset (e.g., a macrocell paging offset), a paging listening interval, and the like.

Referring back to FIG. 15, the AMS may move from a macro BS to a CSG femto BS that the AMS subscribed to. In this case, the AMS may transmit a RNG-REQ message including the P timer to the CSG femto BS so as to perform location update to the femto BS at step S503.

The following Table 6 shows an example of the RNG-REQ message applicable to the embodiments of the present invention.

TABLE 6

| Syntax | Size (bit) | Notes |
|---|---|---|
| RNG-REQ_Message_format( ) { ~ | — | — |
| P timer (Primary paging offset validity timer) | | P timer == 0 {although AMS moves out of the primary group, the AMS receives a paging message through a second paging offset without performing LU. Namely, there is proposed a method for optionally utilizing the P timer} |
| ~ } //End of RNG-REQ | | |

Referring to Table 6, the AMC may optionally utilize the P timer. For example, if the AMS moves out of its own CSG femtocell area, the P timer starts operation. Then, if the AMS does not return the CSG femtocell area after the expiration of the P timer, the AMS may perform location update. If the P timer is set to 0, the AMS does not perform the location update although it moves out of the femtocell area, and may receive a paging message from a macro BS using a second paging offset.

At step S504, the CSG femto BS may transmit a ranging response (RNG-RSP) message including at least one of the P timer parameter, a location update response parameter indicating the result of location update, new paging information assigned to the AMS, a paging controller ID, and a temporary ID maintained by the AMS in the idle mode.

In FIG. 15, the MS may use the P timer even in the macrocell area not the CSG femtocell area. If the AMS uses the P timer, the AMS does not perform location update during the operation of the P timer while moving from the macro BS to the CSG femto BS. In this case, the AMS does not perform Steps S503 and S504. In other words, Steps S503 and S504 may not use the P timer. Although the P timer is used, Steps S503 and S504 may be used when the P timer has expired after the AMS has moved to the femto BS.

If the call or downlink data for the AMS exists, the paging controller (PC) may transmit a paging message to a CSG femto BS at step S505 and transmit the same paging message to the macro BS at step S506 in such a manner that two-step paging message transmission is carried out at steps S505 and S506.

For example, the paging controller (PC) may simultaneously or sequentially transmit the paging message to a CSG femto BS and a macro BS including the CSG femto BS. That is, while the AMS moves from one BS to another BS, the paging controller (PC) may firstly transmit a paging message to the CSG femto BS to which the AMS performs location update. Upon receiving no response to the paging message from the macro BS, the paging controller (PC) may transmit a paging message to the macro BS. Alternatively, the paging controller (PC) may simultaneously transmit the paging message to the CSG femto BS and the macro BS.

In order to receive a paging message from the CSG femto BS having a CSG femtocell PGID, the AMS may monitor the paging message at a time point at which a first paging offset having the DREG-CMD message appears. Upon receiving the paging message from the first paging offset, the AMS may monitor a paging message at a time point at which the second paging offset appears.

In FIG. 15 and the following embodiments to be described in the following description, information of the P timer may be transmitted to the AMS through the DREG-REQ/CMD messages, the RNG-REQ/RSP messages, a SuperFrame-Header (SFH), or a neighbor BS advertisement (NBR-ADV) message.

Figure 16:
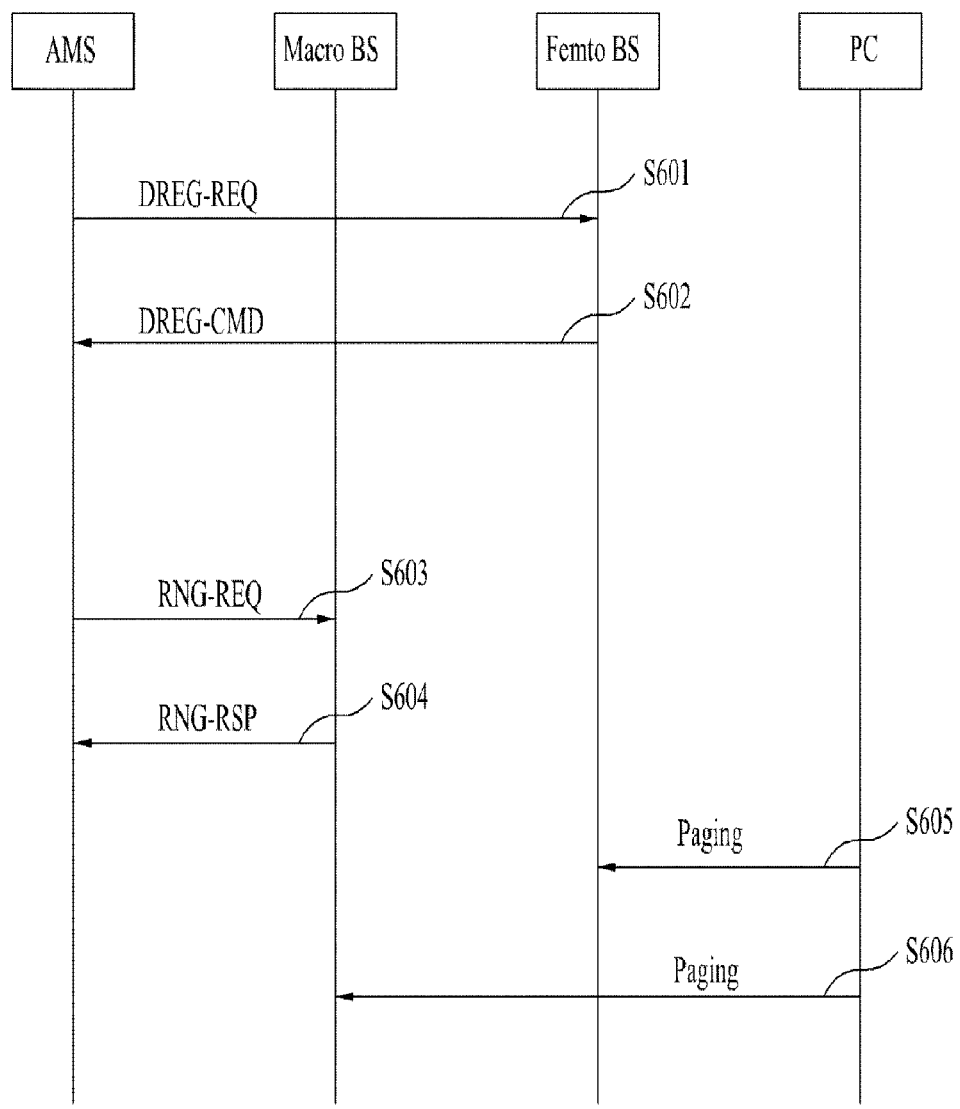
FIG. 16 is a flowchart illustrating another method for performing two-step paging according to one embodiment of the present invention.

FIG. 16 is a flowchart illustrating another method for performing two-step paging according to one embodiment of the present invention.

Basic assumptions and basic conditions of FIG. 16 are identical to those of FIG. 15. However, FIG. 16 shows an exemplary case in which the AMS enters an idle mode at the femto BS. The AMS may transmit the DREG-REQ message including information of the P timer to the CSG femto BS so as to enter the idle mode at step S601.

In response to the DREG-REQ message, the CSG femto BS may transmit the DREG-CMD message including at least one of the P timer and the paging information at step S602.

The following Table 7 shows an example of the DREG-REQ message used at step S602.

TABLE 7

| Syntax | Size (bit) | Notes |
|---|---|---|
| MOB_DREG-CMD_Message_format( ) { ~ | — | — |
| P timer (Primary paging offset validity timer) | | When the AMS moves from its CSG femtocell area to another area, the P timer is operated. When the AMS remains in the moved area after the expiration of the P timer, Location Update (LU) is performed. P timer == 0 {although advanced MS (AMS) moves out of the CSG femtocell, the AMS receives a paging message through a second paging offset without performing LU. Namely, the P timer can be optionally used} |
| Paging Information{ Macro BS PGID CSG Femtocell BS PGID Paging Cycle primary paging offset(femtocell paging offset) | | Time at which paging message transmitted from a small paging area (CSG Femto Cell area) is monitored |
| secondary paging offset (macro paging offset) | | Time at which a paging message transmitted from a large paging area (Overlay Macro Cell area) is monitored |
| Paging listening interval } | | Paging message monitoring time |
| ~ } //End of MOB_DREG-CMD | | |

Referring to Table 7, the DREG-CMD message may include the P timer and the paging information. In this case, the paging information may include a Macro BS PGID, a CSG femtocell BS PGID, a paging cycle, a first paging offset (e.g., a femtocell paging offset), a second paging offset (e.g., a macrocell paging offset), a paging listening interval, and the like.

The AMS may move between paging areas during the idle mode. For example, after the AMS enters the idle mode in the CSG femtocell area, the AMS moves the CSG femtocell area to the macrocell area. In this case, the AMS may perform location update (LU) to the macro BS.

In FIG. 16, if the AMS moves the P timer, the AMS does not perform location update (LU) during the operation of the P timer after having moved to the macro BS. However, if the AMS remains in the macrocell area after the expiration of the P timer, the AMS must perform location update (LU) to the macro BS.

Therefore, in order to perform the location update (LU), the AMS may transmit the RNG-REQ message including the P timer parameter to the macro BS at step S603.

At step S604, in response to the RNG-REQ message, the CSG femto BS may transmit the RNG-RSP message including at least one of the P timer parameter, a location update response parameter indicating the result of location update, new paging information assigned to the AMS, a paging controller ID, and a temporary ID maintained by the AMS in the idle mode.

If call or downlink data for the AMS is present, the paging controller (PC) may transmit a paging message to a CSG femto BS at step S605 and transmit the same paging message to the macro BS at step S606 in such a manner that two-step paging message transmission is carried out at steps S605 and S606.

If the P timer is set to 0 in Table 76, the AMS does not perform location update after having moved to the macro BS, and may perform location update to the CSG femtocell BS at a time of the second paging offset. In this case, the AMS does not perform Steps S603 and S604.

In order to receive a paging message from the macro BS having the same macrocell PGID, the AMS may monitor the paging message at a time of the second paging offset contained in the DREG-CMD message. However, the AMS may monitor the paging message transmitted from the CSG femto BS at a first paging offset in the vicinity of the CSG femtocell.

A two-step paging method according to another embodiment of the present invention will hereinafter be described in detail. In order to perform the two-step paging from the macro BS or the CSG femto BS while the AMS enters the idle mode as shown in FIGS. 15 and 16, the AMS may receive a first paging offset, a second paging offset, a CSG femtocell paging ID, and a macrocell paging ID.

However, another embodiment shows that the AMS receives parameters needed for such two-step paging during the location update operation. That is, the AMS may receive parameters needed for two-step paging through the RNG-RSP message during the location update operation.

The following Table 8 shows an example of the RNG-RSP message applicable to another embodiment of the present invention. Specifically, the following Table 8 shows an example of the RNG-RSP message transferred from the macro BS.

TABLE 8

| Syntax | Size (bit) | Notes |
|---|---|---|
| MOB_RNG-RSP_Message_format( ) { ~ | — | — |
| P timer (Primary paging offset validity timer) | | When the AMS moves from its CSG femtocell area to another area, the P timer is operated. When the AMS remains in the moved area after the expiration of the P timer, Location Update (LU) is performed. P timer == 0 {although AMS moves out of the CSG femtocell, the AMC receives a paging message through a second paging offset without performing LU. Namely, the P timer can be optionally used} |
| Paging Information{ Macro BS PGID For (i=0; I < the number of MS's CSG home femtocell BS; i++) { MS CSG Femtocell BS PGID } Paging Cycle primary paging offset(Femtocell paging offset) | | Time at which paging message transmitted from a small paging area (CSG Femto Cell area) is monitored |
| secondary paging offset (Macrocell paging offset) | | Time at which a paging message transmitted from a large paging area (Overlay Macro Cell area) is monitored |
| Paging listening interval } ~ } //End of MOB_RNG-RSP | | Paging message monitoring time |

Referring to Table 8, the RNG-RSP message may include at least one of the P timer parameter, a location update response parameter indicating the result of location update, new paging information assigned to the AMS, a paging controller ID, and a temporary ID maintained by the AMS in the idle mode.

In this case, the new paging information may include a Macro BS PGID, a CSG femtocell BS PGID, a paging cycle, a first paging offset (e.g., femtocell paging offset), a second paging offset (e.g., a macrocell paging offset), a paging listening interval, and the like.

The following Table 9 shows an example of the RNG-RSP message available for another embodiment of the present invention. Specifically, the following Table 9 shows the RNG-RSP message transferred from the macro BS.

TABLE 9

| Syntax | Size (bit) | Notes |
|---|---|---|
| MOB_RNG-RSP_Message_format( ) { ~ | — | — |
| P timer (Primary paging offset validity timer) | | When the AMS moves from its CSG femtocell area to another area, the P timer is operated. When the AMS continuously stays in the moved area after |

TABLE 9-continued

| Syntax | Size (bit) | Notes |
|---|---|---|
| | | the expiration of the P timer, Location Update (LU) is performed. P timer == 0 {although AMS moves out of the CSG femtocell, the AMC receives a paging message through a second paging offset without performing LU. Namely, the P timer can be optionally used} |
| Paging Information{ Macro BS PGID CSG Femtocell BS PGID Paging Cycle primary paging offset(femtocell paging offset) | | Time at which paging message transmitted from a small paging area (CSG Femto Cell area) is monitored |
| secondary paging offset (macro paging offset) | | Time at which a paging message transmitted from a large paging area (Overlay Macro Cell area) is monitored |
| Paging listening interval } ~ } //End of MOB_RNG-RSP | | Paging message monitoring time |

Referring to Table 9, the RNG-RSP message may include at least one of the P timer parameter, a location update response parameter indicating the result of location update, new paging information assigned to the AMS, a paging controller ID, and a temporary ID maintained by the AMS in the idle mode.

Figure 17:
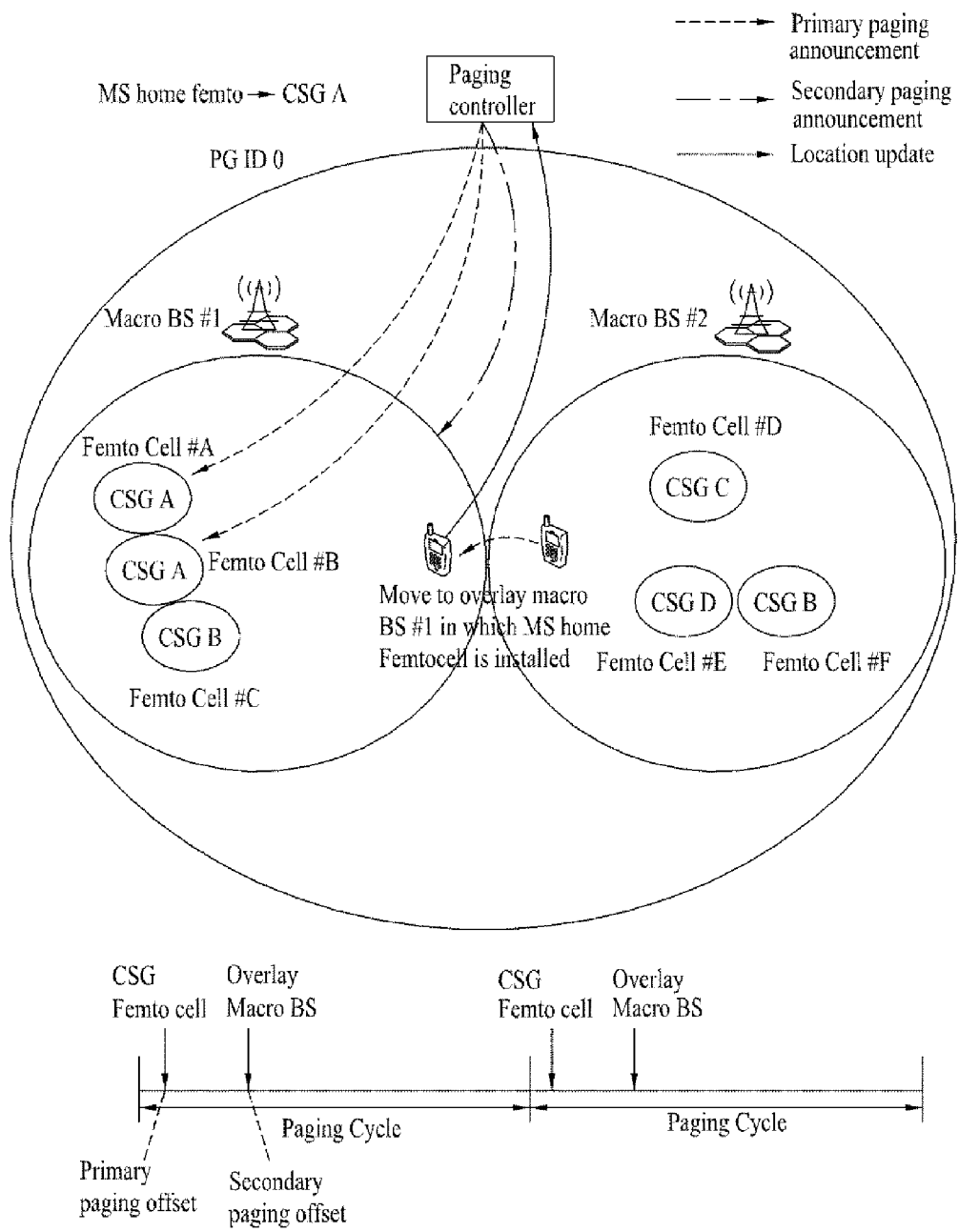
FIG. 17 is a conceptual diagram illustrating a method for performing two-step paging according to one embodiment of the present invention.

FIG. 17 is a conceptual diagram illustrating a method for performing two-step paging according to one embodiment of the present invention.

Referring to FIG. 17, it is assumed that the CSG home femtocell for supporting a CSG service to which the MS subscribed is a femtocell #A or a femtocell #B. In addition, a paging area managed by the macro BS #1 is a macrocell #1 and another paging area managed by the macro BS #2 is a macrocell #2. In this case, each of the PGID of the macrocell #1 and the PGID of the macrocell #2 is set to zero '0'. In other words, the macrocell #1 and the macrocell #2 are contained in the same paging group.

As shown in FIG. 15 or 16, the advanced MS (AMS) may enter the idle mode in the macrocell or femtocell area, and may receive at least one of a first paging offset, a second paging offset, a CSG femtocell PGID, and a macrocell PGID through the DREG-CMD message and/or the RNG-RSP message.

The macrocell #1 may include femtocells #A, #B, #C and #D, and the macrocell #2 may include femtocells #D, #E and #F. In other words, the macrocell #1 may include a CSG femtocell, while the macrocell #2 may not include the CSG femtocell. FIG. 167 shows an exemplary case in which the AMS (or MS) in the idle mode moves from the macrocell #2 to the macrocell #1.

In general, although the MS moves from the macrocell #2 to the macrocell #1, the MS does not perform location update because the macrocell #2 has the same PGID as that of the macrocell #1. However, the macrocell #1 includes CSG femtocells #A and #B of the MS, so that the MS does not perform location update to the macrocell BS #1 (i.e., the macro BS #1).

In this case, if the MS receives a call signal from an external part, the paging controller may transmit a paging announcement message to the CSG femto BS and the macro BS #1 in such a manner that two-step paging announcement messaging is carried out. For example, the paging controller may transmit a paging announcement message to the CSG femtocell area of the MS so as to search for the MS. Upon receiving no response to the paging announcement message, the paging controller is able to transmit the paging announcement message to the overlay macrocell area.

Therefore, the paging controller need not transmit a paging message to all macro BSs or all femto BSs so as to search for the MS, but transmits the paging message to only the CSG femto BS and/or the macro BS (e.g., the macro BS #1) including the CSG femto BS, so that an amount of overhead caused by the paging message can be greatly reduced.

As shown in FIG. 17, in order to allow the MS to receive a paging message during the paging cycle, the MS can monitor the paging message transferred from the CSG femto BS and the macro BS at the first paging offset and the second paging offset, respectively.

Figure 18:
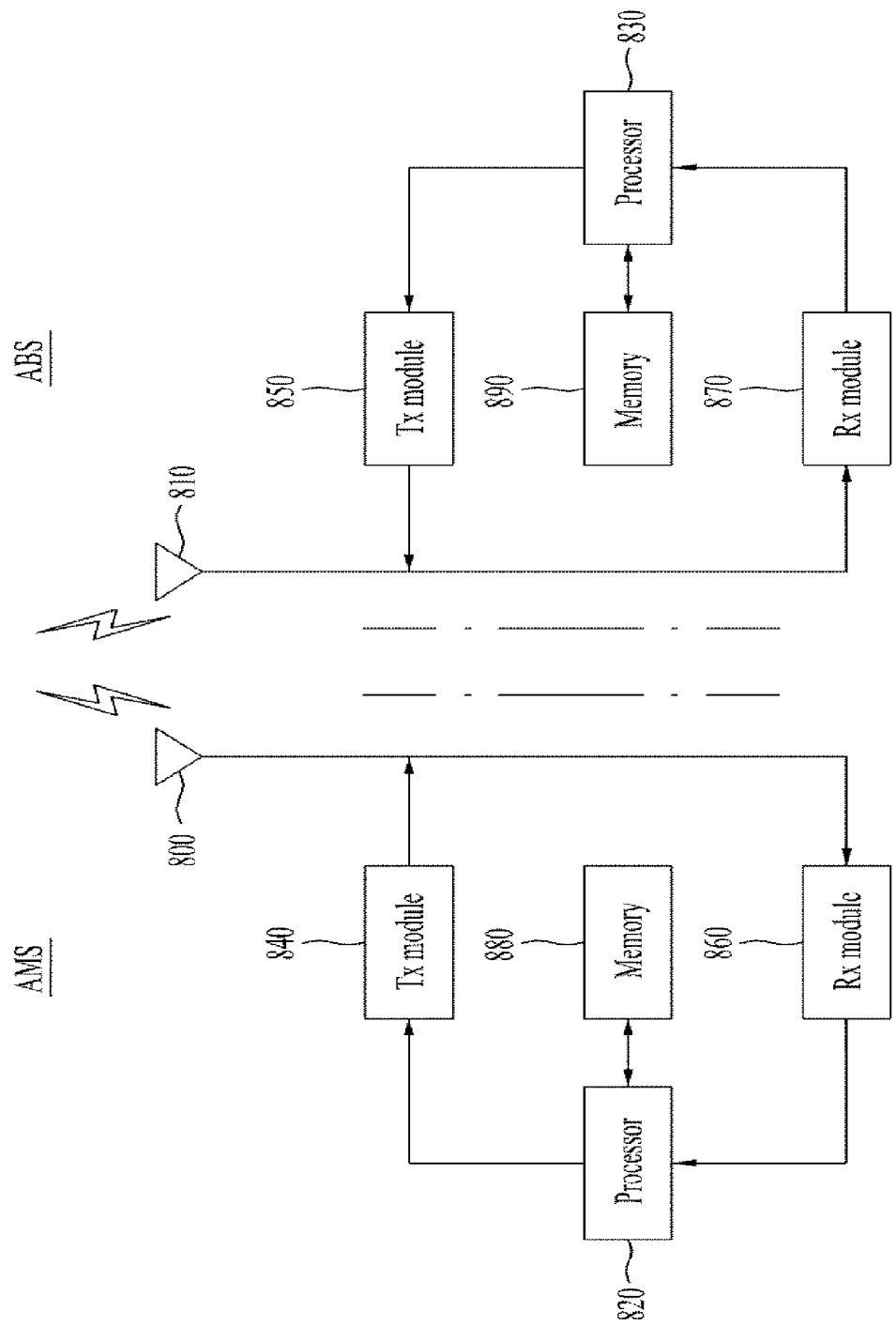
FIG. 18 is a block diagram illustrating detailed constituent components of the MS and BS illustrated in FIGS. 4 to 7 according to embodiments of the present invention.

FIG. 18 is a block diagram illustrating detailed constituent components of an advanced MS (AMS) and an advanced BS (ABS) that can be implemented in the above-mentioned embodiments.

Referring to FIG. 18, each of the AMS and the ABS may include an antenna 800 or 810 for transmitting and receiving information, data, signals and/or messages, a Transmission (Tx) module 840 or 850 for transmitting messages by controlling the antenna 800 or 810, a Reception (Rx) module 860 or 870 for receiving messages by controlling the antenna 800 or 810, a memory 880 or 890 for storing information related to an advanced base station (ABS) communication, and a processor 820 or 830 for controlling the memory 880 or 890. In this case, the ABS may be a femto BS (FBS) or a macrocell BS (MBS). The components of the AMS are the counter parts of those of the ABS. The components of the transmitter and the receiver will be described below in more detail.

The antennas 800 and 810 include Tx antennas for transmitting signals generated from Tx modules 840 and 850 and Rx antennas for receiving radio frequency (RF) signals and providing the received RF signals to the Rx modules 860 and 870. If Multiple Input Multiple Output (MIMO) is supported, two or more antennas may be provided.

The processors 820 and 830 generally provide overall control to the AMS and the ABS, respectively. Especially, the processors 820 and 830 may perform a control function for implementing the above-described exemplary embodiments of the present invention, a variable MAC frame control function based on service characteristics and a propagation environment, a handover function, an authentication and encryption function, etc. In addition, each of the processors 820 and 830 may include an encryption module for controlling encryption of various messages and a timer module for controlling transmission and reception of various messages.

The Tx modules 840 and 850 may encode and modulate transmission data scheduled by the processors 820 and 830 in a predetermined coding and modulation scheme and provide the modulated data to the antennas 800 and 810.

The Rx modules 860 and 870 may recover original data by demodulating and decoding data received through the antennas 800 and 810 and provide the recovered data to the processors 820 and 830.

The memories 880 and 890 may store programs for processing and control of the processors 820 and 830 and temporarily store input/output data (on the side of the AMS, an uplink grant received from the ABS, system information, a station identifier (STID), a flow identifier (FID), an action time, and the like).

Each of the memories 880 and 890 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

The above-mentioned embodiments of the present invention can be realized using constituent elements and functions of the AMS and ABS illustrated in FIG. 18. Detailed description of the functions of the AMS and the ABS will hereinafter be described in detail.

The processor 820 contained in the AMS may control operations of the idle mode of the AMS. That is, the processor 820 may generate a DREG-REQ message to initiate the idle mode, and transmit the DREG-REQ message to the ABS through the Tx module 840. In addition, the processor 820 may receive the DREG-CMD message from the ABS, and decode parameters contained in the DREG-CMD message, so that it can carry out the idle mode operation.

The processor 820 of the AMS may control a location update to the ABS when a location update condition is satisfied in the idle mode. That is, the processor 820 of the AMS may construct the RNG-REQ message including the P timer parameter, transmit the RNG-REQ message to the ABS, and receive the RNG-RSP message from the ABS. In this case, the processor 820 may monitor the first paging offset and/or the second paging offset using the P timer parameter contained in the RNG-REQ message and new paging information.

The processor 830 contained in the ABS may support the idle mode operation of the AMS. For example, if the processor 830 receives the DREG-REQ message from the ABS, the processor 830 of the ABS constructs a DREG-CMD message including at least one of the P timer parameter and the paging information, and transmits the DREG-CMD message to the AMS.

In addition, the ABS may support the location update of the AMS. For example, if the ABS receives the RNG-REQ message from the AMS, the processor 830 of the ABS may transmit the RNG-RSP message including at least one of the P timer parameter and/or the new paging information to the AMS. In this case, the ABS may be an overlay macrocell BS or a femtocell BS.

Exemplary embodiments of the present invention may be achieved by various means, for example, hardware, firmware, software, or a combination thereof. In a hardware configuration, location update methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, and/or microprocessors.

In a firmware or software configuration, the methods according to the exemplary embodiments of the present invention may be implemented in the form of a module, a procedure, a function, etc. performing the above-described functions or operations. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of claims, and all modifications within equivalent ranges of the present invention are contained in the scope of the present invention.

It is apparent that the present invention may be embodied by a combination of claims which do not have an explicit cited relation in the appended claims or may include new claims by amendment after application.

MODE FOR THE INVENTION

Various embodiments have been described in the best mode for carrying out the invention.

INDUSTRIAL APPLICABILITY

Exemplary embodiments of the present invention have the following effects. First, the embodiments of the present invention can reduce the number of location updates of the MS. Second, the embodiments of the present invention can reduce overhead needed for paging message transmission of the BS. Third, the embodiments of the present invention can effectively perform location update when the MS moves from a femtocell to a macrocell, moves from a macrocell to a femtocell, or moves from one femtocell to another femtocell.

The invention claimed is:

1. A method for performing a location update in a mobile station (MS) of a wireless communication system including a first femtocell, the method comprising:
receiving a deregistration command (DREG-CMD) message that includes a paging group identifier (ID) of a first femtocell base station (BS) in which the MS stays and a paging group ID of a macro BS including the first femtocell BS;
initiating a location update delay timer while the MS moves from the first femtocell area to a second femtocell area having a paging group ID different from that of the first femtocell; and
performing a location update according to an operation of the location update delay timer.

2. The method according to claim 1, wherein:
the second femtocell is contained in an area of the macro BS, and
the performing of the location update includes performing the location update to the macro BS when the location update delay timer has expired.

3. The method according to claim 1, wherein the performing of the location update includes performing the location update when a location update timer for a timer based location update has expired before the expiration of the location update delay timer.

4. The method according to claim 1, wherein the performing of the location update includes releasing the location update delay timer, if the MS returns to the first femtocell area before the expiration of the location update delay timer.

5. The method according to claim 1, wherein the performing of the location update includes performing the location update when the MS moves out of an area of the paging group of the macro BS before the expiration of the location update delay timer.

6. A method for performing a location update in a mobile station (MS) of a wireless communication system including a first femtocell, the method comprising:
receiving a deregistration command (DREG-CMD) message including a paging group identifier (ID) of a first femtocell base station (BS) in which the MS stays;
initiating a location update delay timer while the MS moves from the first femtocell area to a second femtocell area; and
performing a location update according to an operation of the location update delay timer,
wherein the paging group ID of the first femtocell is identical to that of the second femtocell, and a closed subscriber group (CSG) of the first femtocell is different from that of the second femtocell.

7. The method according to claim 6, further comprising:
receiving a paging advertisement (MOB_PAG-ADV) message including a closed subscriber group (CSG) ID of the second femtocell from the second femtocell BS.

8. The method according to claim 6, wherein the performing of the location update includes immediately performing the location update to the second femtocell when the location update delay timer has expired.

9. The method according to claim 6, wherein the performing of the location update includes performing the location update when a location update timer for a timer based location update has expired before the expiration of the location update delay timer.

10. The method according to claim 6, wherein the performing of the location update includes:
releasing the location update delay timer, if the MS returns to the first femtocell area before the expiration of the location update delay timer.

* * * * *